(12) United States Patent
Wu et al.

(10) Patent No.: US 12,511,851 B2
(45) Date of Patent: Dec. 30, 2025

(54) VISUAL GUIDED MESH REPAIR

(71) Applicant: Tencent America LLC, Palo Alto, CA (US)

(72) Inventors: Kui Wu, Irvine, CA (US); Xifeng Gao, Tallahassee, FL (US); Zherong Pan, Bellevue, WA (US)

(73) Assignee: Tencent America LLC, Palo Alto, CA (US)

( * ) Notice: Subject to any disclaimer, the term of this patent is extended or adjusted under 35 U.S.C. 154(b) by 224 days.

(21) Appl. No.: 18/226,664

(22) Filed: Jul. 26, 2023

(65) Prior Publication Data
US 2025/0037397 A1    Jan. 30, 2025

(51) Int. Cl.
*G06T 19/00* (2011.01)
*G06T 15/06* (2011.01)
*G06T 19/20* (2011.01)

(52) U.S. Cl.
CPC .............. *G06T 19/20* (2013.01); *G06T 15/06* (2013.01)

(58) Field of Classification Search
None
See application file for complete search history.

(56) References Cited

U.S. PATENT DOCUMENTS

| | | | | |
|---|---|---|---|---|
| 8,935,328 B2* | 1/2015 | Tumuluri | ............. | G06Q 10/101 709/204 |
| 9,229,674 B2* | 1/2016 | Tapley | .................... | G06F 3/122 |
| 9,821,517 B2* | 11/2017 | McGatha | ............... | B29C 64/393 |
| 10,022,914 B2* | 7/2018 | Hemani | ................. | B29C 64/386 |
| 10,137,646 B2* | 11/2018 | Stevens | ................. | B29C 64/386 |
| 10,518,473 B2* | 12/2019 | Huang | .................. | B29C 64/386 |
| 10,802,467 B2* | 10/2020 | Wiedenhoefer | ........ | B33Y 50/02 |
| 11,385,624 B2* | 7/2022 | Gonzalez | ............... | B33Y 50/00 |
| 11,513,494 B2* | 11/2022 | Gonzalez | ............... | B33Y 50/00 |
| 11,886,165 B2* | 1/2024 | Marinov | ................ | B33Y 50/00 |

(Continued)

FOREIGN PATENT DOCUMENTS

WO    2022023199 A1    2/2022

OTHER PUBLICATIONS

Lorenzo Diazzi and Marco Attene. 2021. Convex Polyhedral Meshing for Robust Solid Modeling. ACM Trans. Graph. 40, 6, Article 259, Dec. 2021, 16 pages.

(Continued)

*Primary Examiner* — Martin Mushambo
(74) *Attorney, Agent, or Firm* — ArentFox Schiff LLP

(57) ABSTRACT

Aspects of the disclosure provide methods and apparatuses for mesh processing. In some examples, a method for mesh processing includes receiving an input mesh that is bounded in a bounding box. The input mesh is formed of a first plurality of vertices and a first plurality of faces that connects the first plurality of vertices. The method further includes calculating at least a first visual measure for one or more faces in the first plurality of faces. At least the first visual measure for a face is calculated according to a number of valid rays respectively at a plurality of sampling positions of the face, a valid ray at a sampling position is a ray that is traced from the sampling position to the bounding box. The method also includes performing adjustments to the input mesh to generate a repaired mesh according to at least the first visual measure.

18 Claims, 25 Drawing Sheets

(56) References Cited

U.S. PATENT DOCUMENTS

| | | | | |
|---|---|---|---|---|
| 2011/0087350 | A1* | 4/2011 | Fogel | G06T 19/00 |
| | | | | 700/98 |
| 2017/0287231 | A1* | 10/2017 | Gregson | G06T 15/08 |
| 2020/0326174 | A1* | 10/2020 | Piatek | G06F 30/17 |
| 2022/0230380 | A1* | 7/2022 | Laine | G06T 15/005 |

OTHER PUBLICATIONS

Cédric Portaneri, Mael Rouxel-Labbé, Michael Hemmer, David Cohen-Steiner, and Pierre Alliez. 2022. Alpha Wrapping with an Offset. ACM Trans. Graph. 41, 4, Article 127, Jul. 2022, 22 pages.
Tao Ju. 2004. Robust Repair of Polygonal Models. ACM Trans. Graph. 23, 3, Aug. 2004, 888-895.
Yixin Hu, Teseo Schneider, Bolun Wang, Denis Zorin, and Daniele Panozzo. 2020. Fast Tetrahedral Meshing in the Wild. ACM Trans. Graph. 39, 4, Article 117, Jul. 2020, 18 pages.
Lei Chu, Hao Pan, Yang Liu, and Wenping Wang. 2019. Repairing Man-Made Meshes via Visual Driven Global Optimization with Minimum Intrusion. ACM Trans. Graph. 38, 6, Article 158, Nov. 2019, 18 pages.
Yixin Hu, Qingnan Zhou, Xifeng Gao, Alec Jacobson, Denis Zorin, and Daniele Panozzo. 2018. Tetrahedral Meshing in the Wild. ACM Trans. Graph. 37, 4, Article 60, Jul. 2018, 14 pages.
International Search Report with Written Opinion issued Dec. 18, 2023 in Application No. PCT/US2023/074657 (13 pages).

* cited by examiner

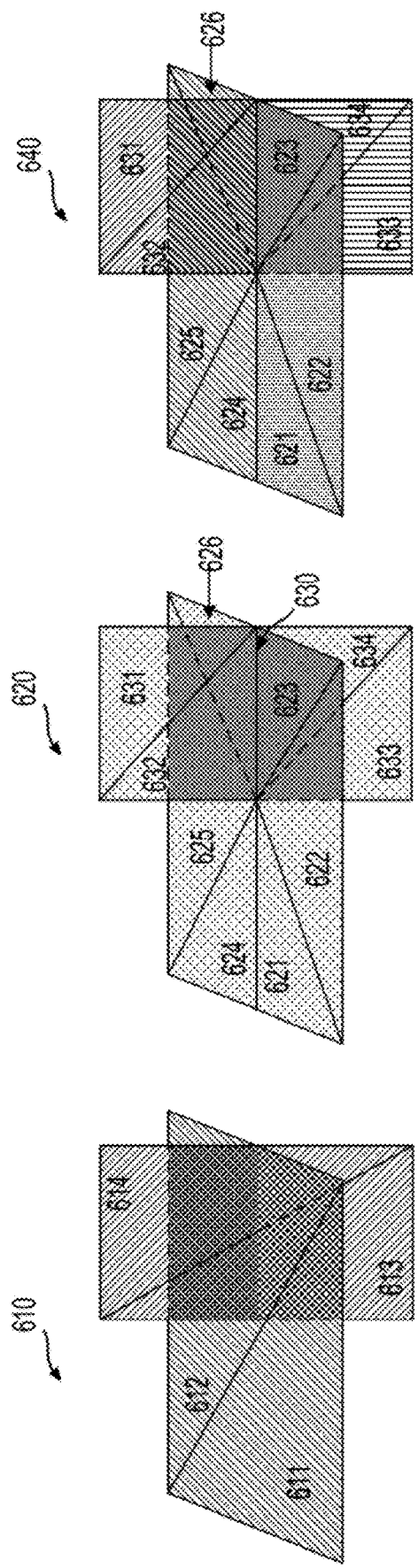

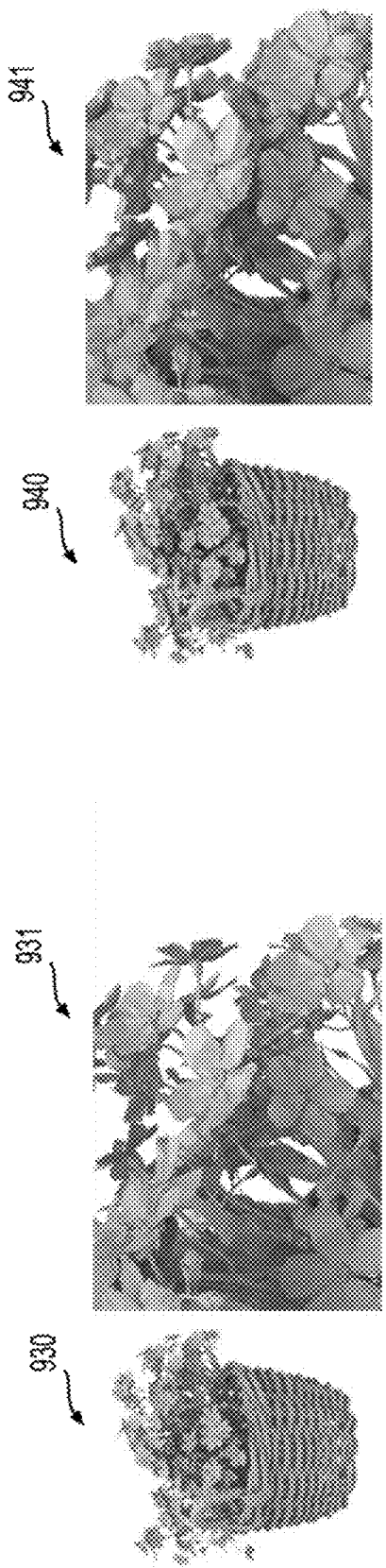
FIG. 9A
FIG. 9B
FIG. 9C
FIG. 9D

| | Watertight | Manifold | Face # | HD | LFD | PSNR | Memory | Time |
|---|---|---|---|---|---|---|---|---|
| Input Mesh | 82% | 2% | 29K | | | | | |
| Related 1 | 100% | 100% | 14K | 0.05 | 3.3e3 | 27.1 | 7Mb | 0.4 |
| Related 2 | 100% | 23% | 4K | 0.17 | 2.4e4 | 19.2 | 872Mb | 287.0 |
| Related 3 | 100% | 100% | 9K | 0.18 | 1.3e4 | 24 | 695Mb | 117.0 |
| Related 4 | 100% | 100% | 62K | 0.02 | 1.4e3 | 30 | 99Mb | 7.9 |
| Related 5 | 20% | 100% | 21K | 0.02 | 8.7e0 | 38.1 | 145Mb | 183.1 |
| Related 6 | 100% | 17% | 94K | 0.05 | 1.4e3 | 31.6 | 297Mb | 4.0 |
| Related 7 | 100% | 39% | 163K | 0.03 | 2.0e2 | 51.0 | 369Mb | 187.2 |
| Output Mesh by Pipeline (101) | 100% | 100% | 28K | 0.02 | 7.4e-1 | 60.2 (59.9*) | 684Mb | 22.1 |

*FIG. 10*

FIG. 11A
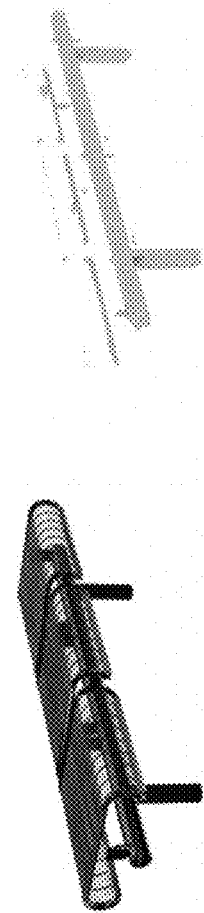
FIG. 11D
FIG. 11B
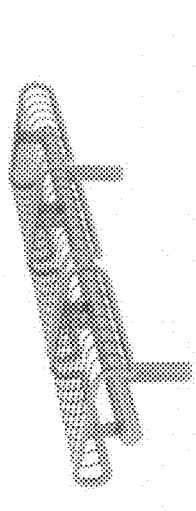
FIG. 11E
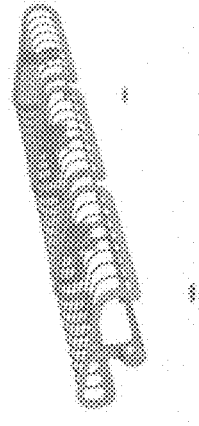
FIG. 11H
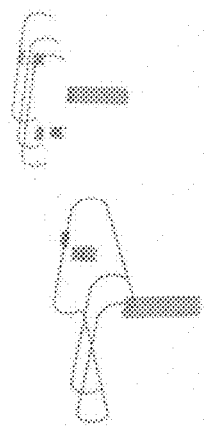
FIG. 11G
FIG. 11C
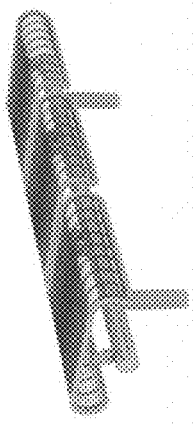
FIG. 11F
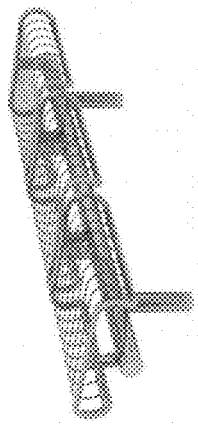
FIG. 11I
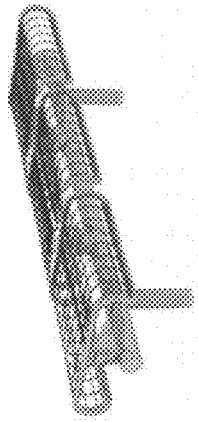

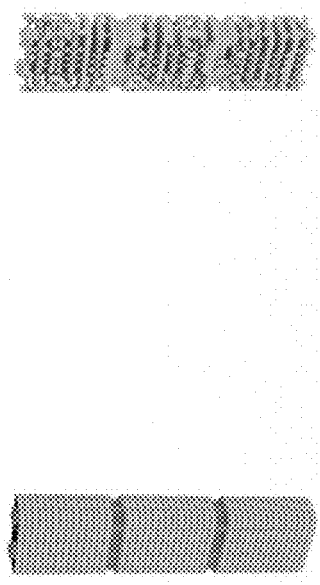
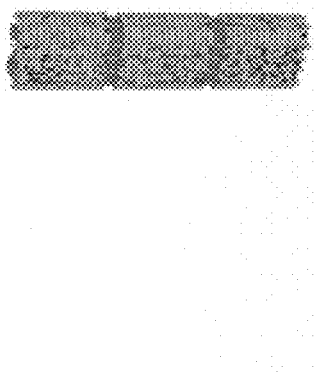
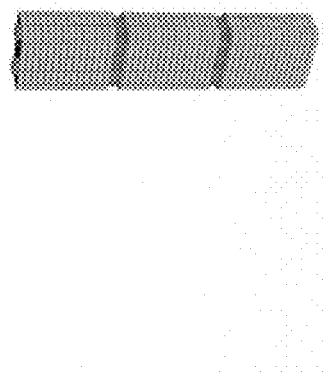
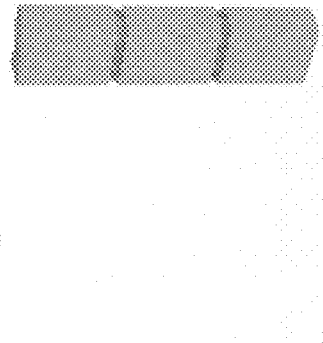
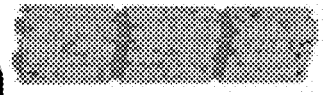
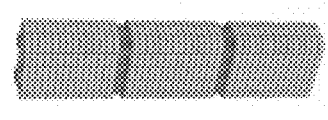
FIG. 14A  FIG. 14B  FIG. 14C
FIG. 14D  FIG. 14E  FIG. 14F
FIG. 14G  FIG. 14H  FIG. 14I

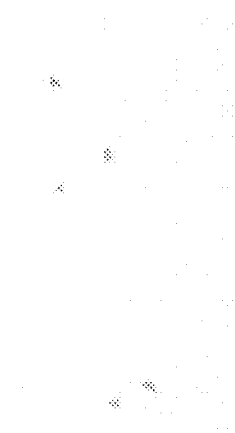
FIG. 15C
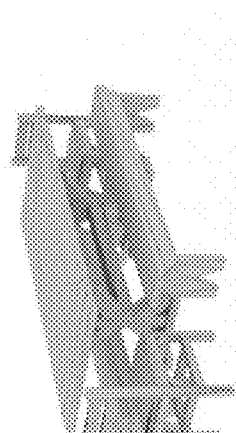
FIG. 15F
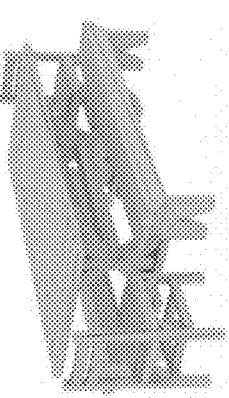
FIG. 15I
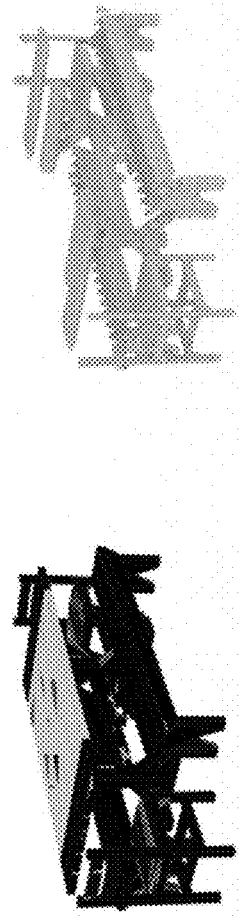
FIG. 15B
FIG. 15E
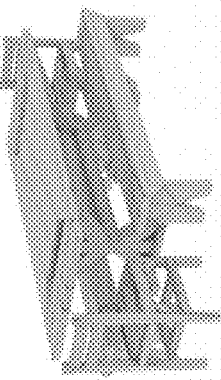
FIG. 15H
FIG. 15A
FIG. 15D
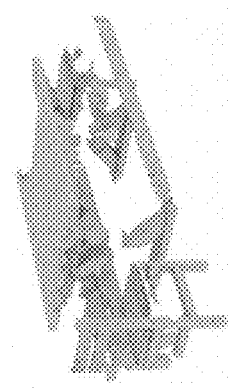
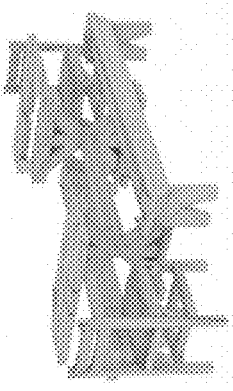
FIG. 15G

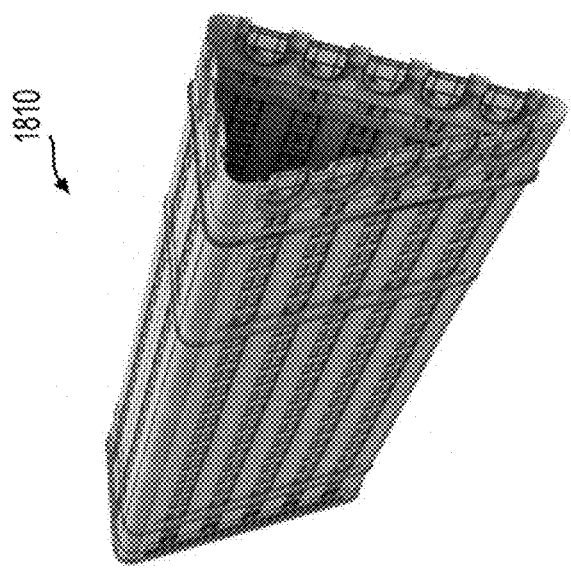
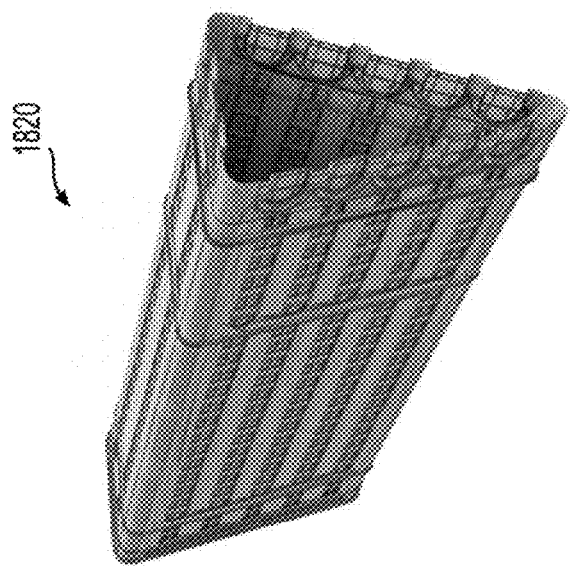
FIG. 18

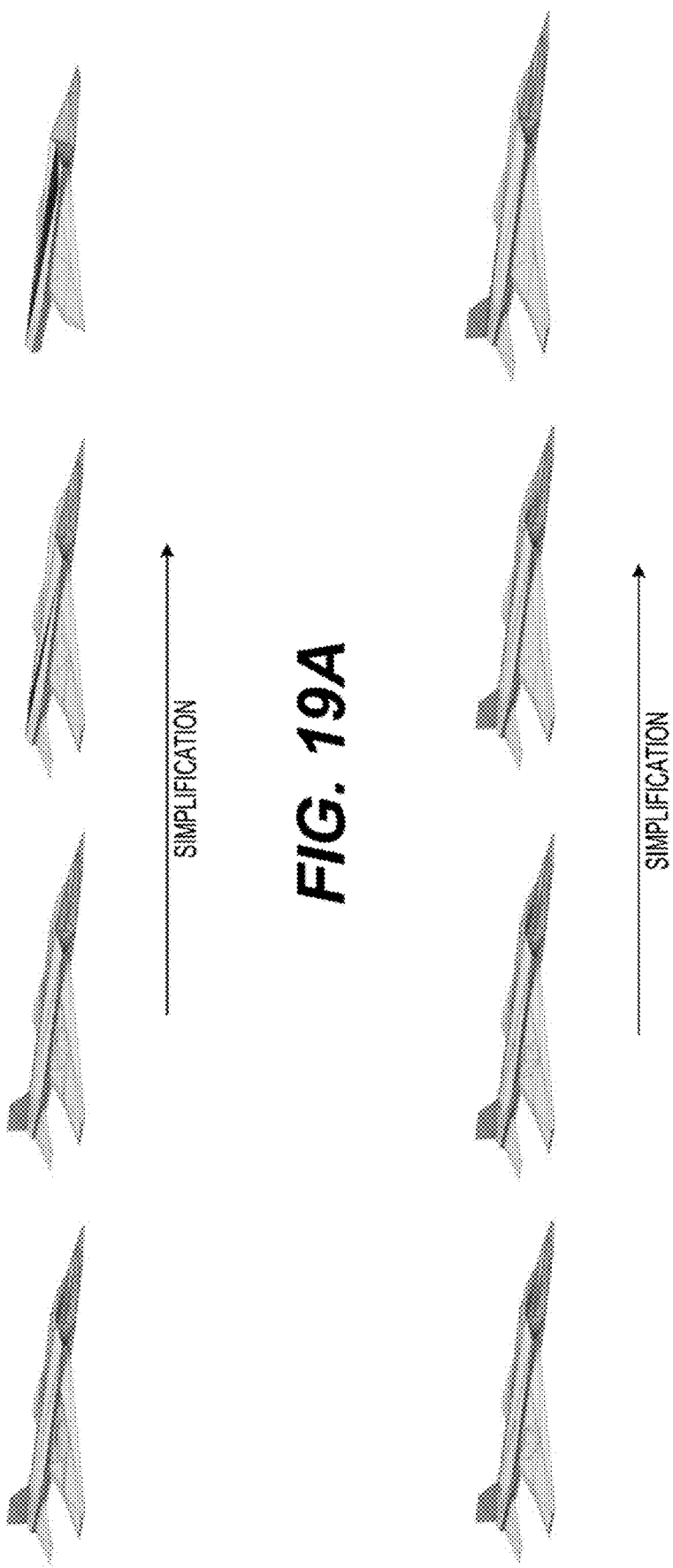

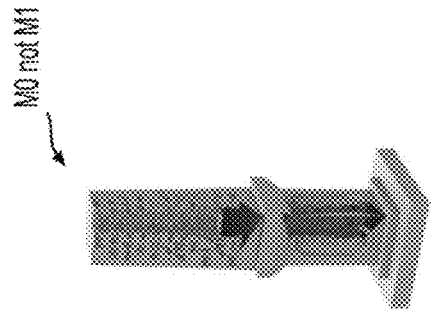
FIG. 20A
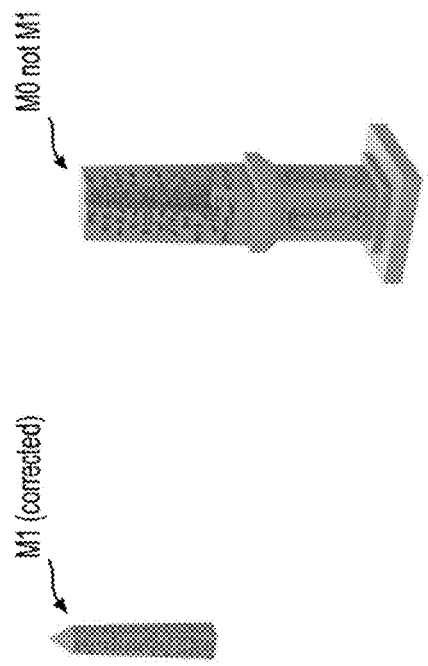
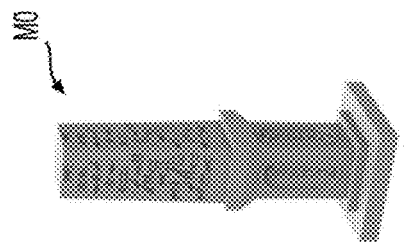
FIG. 20B

VISUAL GUIDED MESH REPAIR

TECHNICAL FIELD

The present disclosure describes embodiments generally related to mesh processing technology.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. In some examples, point clouds and meshes can be used as 3D representations of the world.

SUMMARY

Aspects of the disclosure provide methods and apparatuses for mesh processing. In some examples, a method for mesh processing includes receiving an input mesh that is bounded in a bounding box. The input mesh is formed of a first plurality of vertices and a first plurality of faces that connects the first plurality of vertices. The method further includes calculating at least a first visual measure for one or more faces in the first plurality of faces. At least the first visual measure for a face is calculated according to a number of valid rays respectively at a plurality of sampling positions of the face, a valid ray at a sampling position is a ray that is traced from the sampling position to the bounding box. The method also includes performing adjustments to the input mesh to generate a repaired mesh according to at least the first visual measure.

According to an aspect of the disclosure, to calculate at least the first visual measure, a first number of valid rays at a first sampling position at a positive side of the face is determined, the positive side is pointed by a face normal of the face. Further, a second number of valid rays at the first sampling position at a negative side of the face is determined, the negative side is opposite of the positive side. At least the first visual measure of the face is calculated according to at least the first number of valid rays and the second number of valid rays.

In some examples, at least the first visual measure includes a visibility measure. To calculate the visibility measure, among first numbers of valid rays respectively associated with the plurality of sampling positions at the positive side of the face and second numbers of valid rays respectively associated with the plurality of sampling positions at the negative side of the face, a maximum number of valid rays is determined. The visibility measure for the face is calculated based on the maximum number of valid rays.

In some examples, at least the first visual measure includes an orientation measure. To calculate the orientation measure, a difference of a first total number of valid rays at the positive side of the face and a second total number of valid rays at the negative side of the face is calculated. The orientation measure for the face is calculated based on the difference.

In some examples, at least the first visual measure includes an openness measure. To calculate the openness measure, a ratio between a smaller one of the first number of valid rays and the second number of valid rays and a larger one of the first number of valid rays and the second number of valid rays is calculated. The openness measure is calculated based on the ratio.

In some examples, the orientation measure for the face is indicative of the face being misoriented, and the face normal of the face is flipped to an opposite direction for an orientation adjustment of the face. The orientation adjustment is a part of local repair in some examples.

In some examples, the openness measure for the face indicates that the face is an open surface, and a closed shell for an openness adjustment of the face is formed, the closed shell is formed by vertices of the face and additional vertices that offset the vertices of the face by a distance. The vertices of the face and the additional vertices are connected by faces that form the closed shell. In an example, the additional vertices are offset from the vertices of the face in an opposite direction of the face normal by the distance. The distance is a user-defined distance in an example. The openness adjustment is a part of local repair in some examples.

In some examples, an intermediate mesh is generated with initial adjustments (e.g., local repair) to the input mesh. The intermediate mesh is formed by a second plurality of vertices and a second plurality of faces that connects the second plurality of vertices. The second plurality of faces includes the first plurality of faces. In some examples, an initial space partition of a volume in the bounding box is performed based on the second plurality of vertices. Further, an additional space partition of the volume in the bounding box can be performed according to the second plurality of faces. Thus, the volume is partitioned into cells by a plurality of splitting faces, the plurality of splitting faces includes the second plurality of faces. The plurality of splitting faces can be classified into visible faces, invisible faces and extra faces based on the visibility measure for the plurality of splitting faces. An interface mesh is determined from the plurality of splitting faces. In some examples, the interface mesh is determined to maximize a use of the visible faces and to minimize a use of the extra faces.

In an example, classifications for the cells are determined to minimize a cost function, each of the cells is classified into one of an interior cell and an exterior cell, the cost function has a first portion and a second portion. The first portion penalizes incorrectly oriented faces in the visible faces in response to the classifications, and the second portion penalizes a use of one or more faces from the extra faces in the interface mesh that borders interior cells with exterior cells.

In some examples, the number of sampling portions of a face is determined based on an area of the face and a minimum sampling number for each face.

Some aspects of the disclosure provide an apparatus that includes processing circuitry. The processing circuitry is configured to perform the method for mesh processing.

Aspects of the disclosure also provide a non-transitory computer-readable medium storing instructions which when executed by a computer cause the computer to perform the method for mesh processing.

BRIEF DESCRIPTION OF THE DRAWINGS

Further features, the nature, and various advantages of the disclosed subject matter will be more apparent from the following detailed description and the accompanying drawings in which:

FIGS. 6A-6C show diagrams illustrating space partition and patch merging in some examples.

FIGS. 9A-9D show diagrams of the ablation study on offset distance in an example based on a flower model.

FIG. 10 shows a table comparing statistics of algorithm examples.

FIGS. 11A-11I show meshes of a chair model in some examples.

FIGS. 14A-14I show meshes of a skyscraper model in some examples.

FIGS. 15A-15J show meshes of a table model in some examples.

FIG. 18 shows an input mesh and an output mesh in an example.

FIGS. 19A and 19B show examples of mesh simplifications in some examples.

FIGS. 20A and 20B show examples of Boolean operations in some examples.

DETAILED DESCRIPTION OF EMBODIMENTS

Figure 1:
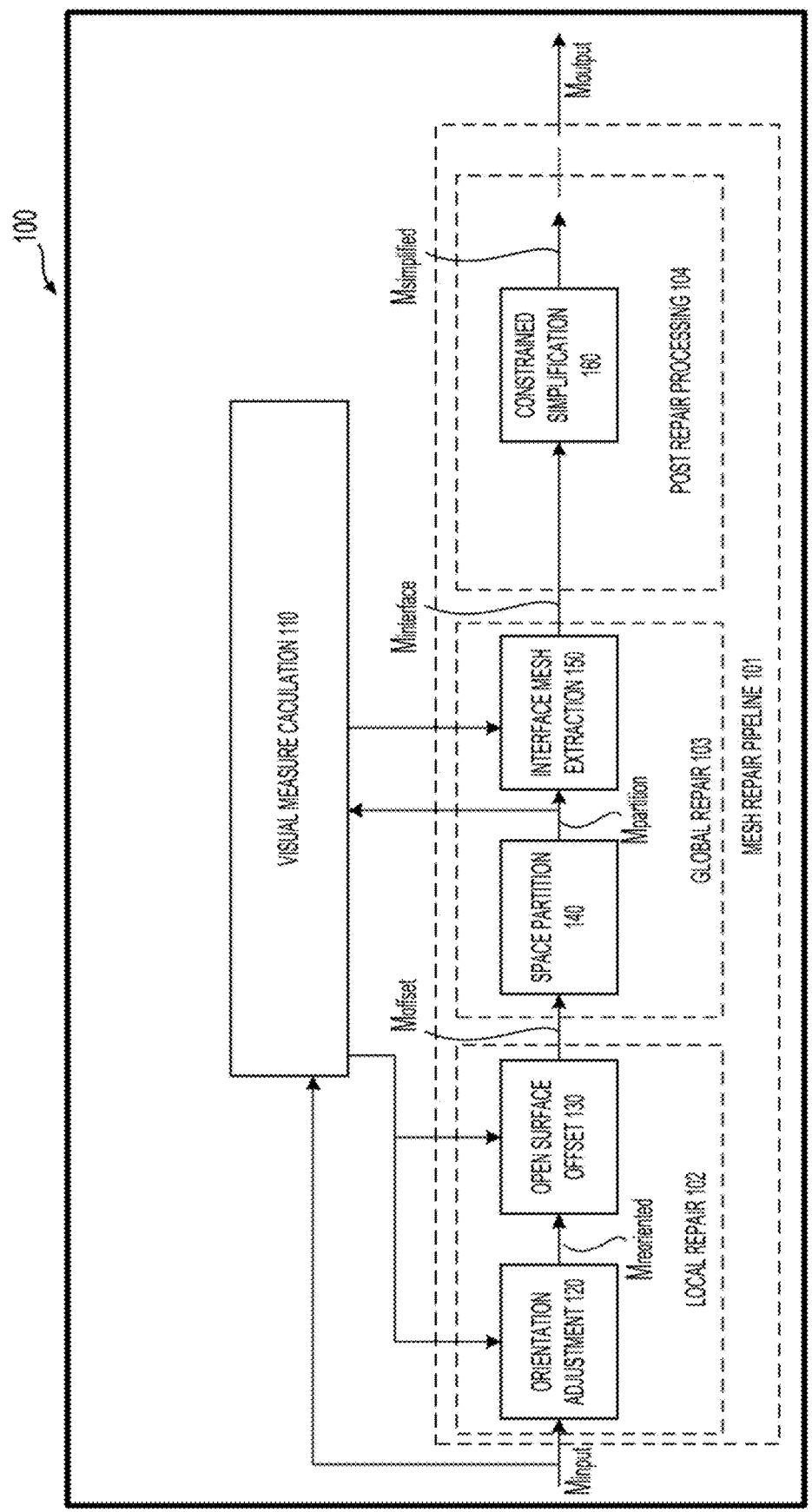
FIG. 1 shows a block diagram of an electronic device for mesh repair according to some embodiments of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, these concepts may be practiced without these specific details.

According to some aspects of the disclosure, a mesh may include defects and/or quality issues, and the defects and quality issues may cause difficulties in further mesh processing. For example, meshes created by modelers can prioritize visual appearance over geometric and topological correctness, leading to various defects, such as gaps, holes, self-intersections, singular elements, and inconsistent orientations. In another example, raw data from online repositories, such as ShapeNet and the like, may include quality issues, such as duplicated faces, self-intersections, non-manifold elements (e.g., non-manifold edges), and the like. In some examples, meshes with defects or quality issues can become invalid for downstream applications. Mesh repair can convert defective meshes into watertight manifold meshes and can greatly benefit downstream applications, such as geometric processing, simulation, fabrication, learning, synthesis and the like. A watertight mesh refers to a 3D model that has closed edges, forming a solid volume. In other words, when a mesh is filled with water and does not leak, the mesh is referred to as watertight mesh. In some examples, a non-manifold edge refers to an edge that is shared by more than two faces.

In some related examples, techniques referred to as local approaches can repair sparse defects while preserving large portions of visual features, but the local approaches often lack guarantees and may inadvertently introduce new issues, such as self-intersections and the like, during the repair process. In some other related examples, techniques referred to as global techniques can repair mesh for robustness. The global techniques can violate the minimal modification requirement and oftentimes impair the defectless mesh parts due to global conversions and remeshing. In some related examples, a global technique utilizes a binary space partitioning (BSP) tree to partition the ambient space and close gaps and holes by solving a graph cut problem or using winding numbers to filter out interior and exterior volumes. The results of the global techniques are sensitive to mis-oriented input meshes. A small mis-orientation or nested structures can lead to drastically different output with undesirable modifications to the visual appearance. It is noted that the BSP tree can introduce a massive number of unnecessary faces that are inherited in the output mesh.

Some aspects of the disclosure provide mesh repair techniques that can be implemented in a mesh repair pipeline architecture. The mesh repair techniques in the present disclosure can achieve certain properties during mesh repair, and can facilitate the downstream applications. For example, the mesh repair techniques in the present disclosure can make a mesh to be manifold, such that differential quantities, such as normal, curvatures and the like can be calculated. Further, the mesh repair techniques in the present disclosure can make a mesh to be watertight to have a well-defined interior and exterior volume, which can be required for certain applications, such as simulation, 3D printing, geometric Boolean operators, and learning-related applications such as shape analysis and synthesis. In addition, the mesh repair techniques in the present disclosure can perform mesh repair with minimal modification, preserving the sharp features and UVs of the input mesh as much as possible. Further, the mesh repair techniques in the present disclosure can achieve robustness and efficiency.

According to some aspects of the disclosure, the mesh repair techniques in the present disclosure can be implemented in a mesh repair pipeline that guides a global graph cut algorithm using local visual cues. In some examples, the mesh repair techniques in the present disclosure include three portions. The first portion of the mesh repair techniques can provide visual measures to quantify visual properties of each face, such as the visibility, orientation, and openness of each face. In some examples, the visual measures can be computed using ray tracing techniques, such as GPU ray tracing techniques. The second portion of the mesh repair techniques can perform local repair (also referred to as local adjustment) of the faces based on the visual measures of the faces. For example, the orientation measurement can be used to reorient the faces and the openness measures of the faces can be used to identify and close open surfaces. The second portion of the mesh repair techniques can perform local adjustments that bootstrap the graph cut and can provide well-conditioned initial guess and solution space. The third portion of the mesh repair techniques can perform a global step guided by visual measures. The global step can divide the ambient space into polyhedral cells and graph-cut the interior cells from the exterior cells based on the visual measures.

The mesh repair techniques in the present disclosure can provide a set of ray-tracing-based visual measures to fix mis-orientations and detect open surfaces. The set of ray-tracing-based visual measures can be further integrated into global techniques, such as a graph cut algorithm, to produce watertight manifold mesh while preserving visual cues. The mesh repair techniques in the present disclosure can also provide a constrained simplification post-process to remove unnecessary split faces generated by the global cut algorithm. Further, the mesh repair techniques in the present disclosure can perform a mesh repair that preserves arbitrary attributes defined on the input mesh such as UV coordinates. The effectiveness and robustness of mesh repair techniques in the present disclosure are tested on ShapeNet with 500 randomly chosen models.

The present disclosure provides techniques of visual measures for visibility, orientation, and openness, and the visual measures are based on ray tracking. Further, the present disclosure provides a mesh repair framework that uses the visual measures through several steps, e.g., open surface closing, face reorientation, and global optimization (e.g., global cut), to effectively repair defective meshes, including gaps, holes, self-intersections, degenerate elements, and inconsistent orientations, while preserving the input details including sharp features and UVs. The mesh repair framework in the present disclosure reduces unnecessary mesh complexity without compromising geometric accuracy or visual quality, while preserving input attributes such as UV coordinates for rendering. The mesh repair framework can be tested on hundreds of models randomly selected from ShapeNet.

A mesh (also referred to as a mesh model, a mesh frame) of an object can include polygons that describe the surface of the object. Each polygon can be defined by vertices of the polygon in 3D space and edges that connect the vertices into the polygon. The information of how the vertices are connected (e.g., information of the edges) is referred to as connectivity information. In some examples, a mesh of an object is formed by connected triangles that describe the surface of the object. Two triangles sharing an edge are referred to as two connected triangles. In some other examples, a mesh of an object is formed by connected quadrilaterals. Two quadrilaterals sharing an edge can be referred to as two connected quadrilaterals. It is noted that meshes can be formed by other suitable polygons.

In the present disclosure, triangle based meshes are used for illustrating the mesh repair techniques, and the mesh repair techniques can be suitably applied to other suitable meshes. A triangle-based mesh is referred to as a triangle mesh, and can be defined as $M \triangleq <V, F>$, where M denotes the triangle mesh, V denotes a set of vertices and F denotes a set of faces, such as triangles connecting vertices. Thus, a triangle mesh is formed of a set of vertices and a set of faces that connect the set of vertices.

FIG. 1 shows a block diagram of an electronic device (100) for mesh repair according to some embodiments of the disclosure. The electronic device (100) includes visual measure calculation module (110) and a mesh repair pipeline (101). The visual measure calculation module (110) is configured to compute values of visual measures for meshes, and the mesh repair pipeline (101) is configured to receive an input mesh $M_{input}$, perform local mesh repair and global mesh repair and generate an output mesh $M_{output}$. The local mesh repair and the global mesh repair are performed based on values of visual measures of the input mesh $M_{input}$ and intermediate meshes during the mesh repair.

In some examples, the input mesh $M_{input}$ is a triangle mesh that assumed to be visually satisfactory but comes with various geometric and topological defects, including gaps, holes, self-intersection, non-manifold elements, duplicated faces, inconsistent orientations and the like. The mesh repair pipeline (101) generates the output mesh $M_{output}$ that is guaranteed to be manifold and watertight. In some examples, the output mesh $M_{output}$ has as few as possible modifications to the visual appearance of the input mesh $M_{input}$.

In the FIG. 1 example, the mesh repair pipeline (101) includes a local repair portion (102), a global repair portion (103) and a post repair processing portion (104). The local repair portion (102) includes an orientation adjustment module (120) and an open surface offset module (130). The global repair portion (103) includes a space partition module (140) and an interface mesh extraction module (150). The post repair processing portion (104) includes a constrained simplification module (160), and other suitable modules that are not shown, such as a topological correction module, a surface attribute recover module and the like.

It is noted that the term module in the present disclosure may refer to a software module, a hardware module, or a combination thereof. A software module (e.g., computer program) may be developed using a computer programming language, and the software module can be executed by one or more processors to perform the functionalities of the software module. A hardware module may be implemented using processing circuitry and/or memory to perform the functionality.

The detail operations of the mesh repair pipeline (101) in the electronic device (100) will be described with reference to FIGS. 2A-2F.

Figure 2A:
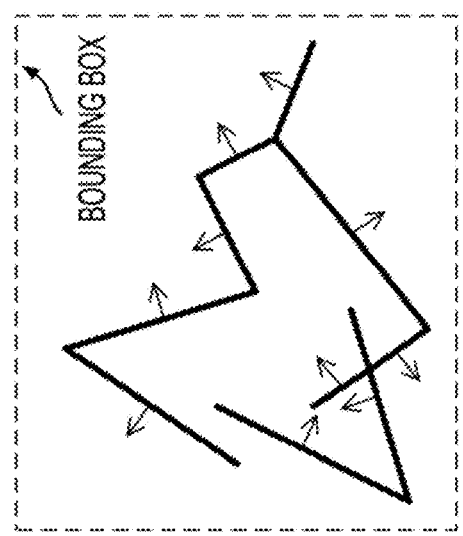
FIGS. 2A-2F show diagrams representing meshes at different stages in a mesh repair pipeline.
Figure 2B:
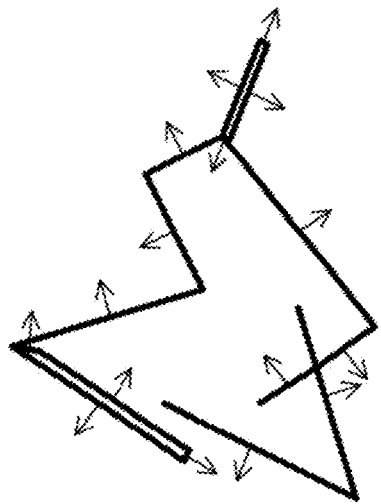
Figure 2C:
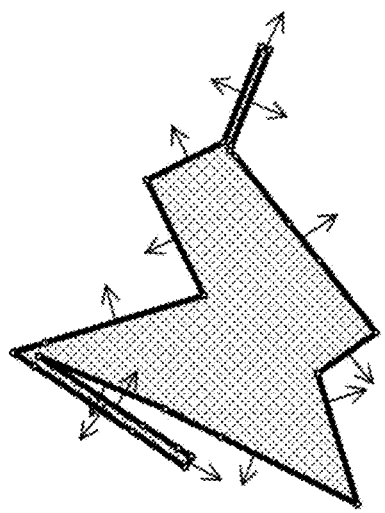
Figure 2D:
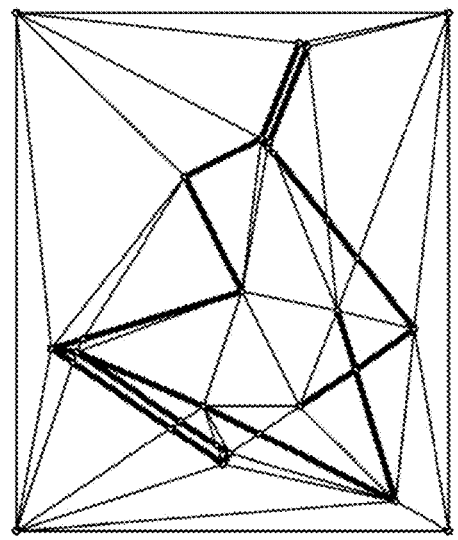
Figure 2E:
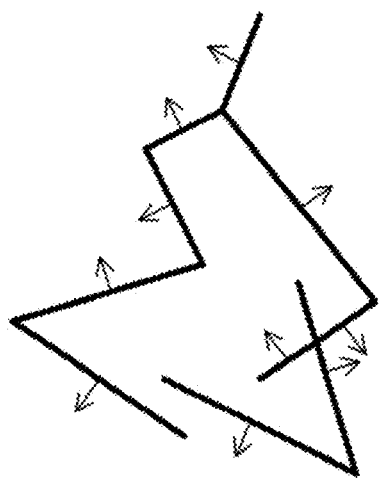
Figure 2F:
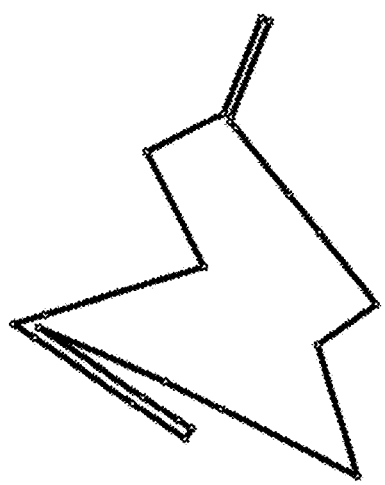

FIGS. 2A-2F show diagrams representing meshes at different stages in the mesh repair pipeline (101). It is noted the meshes are shown using cross-sectional views, lines in the diagrams represent faces, and an arrow on a line representing a face indicates a face normal of the face. FIG. 2A shows the input mesh $M_{input}$ in some examples. FIG. 2B shows a reoriented mesh $M_{reoriented}$ output by the orientation adjustment module (120) in some examples. FIG. 2C shows an offset mesh $M_{offset}$ output by the open surface offset module (130) in some examples. FIG. 2D shows a partition mesh $M_{partition}$ output by the space partition module (140) in some examples. FIG. 2E shows an interface mesh $M_{interface}$ output by the interface mesh extraction module (150) in some examples. FIG. 2F shows a simplified mesh $M_{simplified}$ output by the constrained simplification module (160) in some examples.

According to an aspect of the disclosure, the input mesh $M_{input}$ is visually satisfactory, the visual measures of the input mesh $M_{input}$ can provide guidance to the mesh repair. In some examples, the visual measures include a visibility measure, an orientation measure and an openness measure, and the visual measure calculation module (110) can calculate values of the visibility measure, the orientation measure and the openness measure of each face, such as each triangle.

In some examples, the visibility measure, the orientation measure and the openness measure of a face, such as a triangle, are calculated based on ray tracing at sampling points of the face. For example, the input mesh $M_{input}$ is defined as $M_{input} \triangleq \langle V_{input}, F_{input} \rangle$, where $V_{input}$ denotes a set of vertices and $F_{input}$ denotes a set of faces, such as triangles connecting vertices.

In some examples, for each face $f_{input}^i$ in the $F_{input}$, the face is uniformly sampled, and the number of sampling points $N_S$ for the face is determined based on the area of the face, such as according to Eq. (1)

$$N_S(f_{input}^i) = \max\left\{\left\lceil \frac{A(f_{input}^i)}{A(M_{input})} N_{total} \right\rceil, N_{min}\right\} \quad \text{Eq. (1)}$$

where $A(\ )$ denotes the surface area of input geometric entity, $N_{total}$ denotes a total number of sampling points that is set for sampling the input mesh $M_{input}$, $N_{min}$ denotes a minimum sampling number that is set for sampling each face to avoid under sampling. $S^i$ is used to denote the set of all sampling points for the face $f_{input}^i$, thus $|S^i|=N_S(f_{input}^i)$.

Further, at each location of a sampling point, rays are generated in different directions, and a number of valid rays is determined among the rays at the sampling points.

Figure 3A:
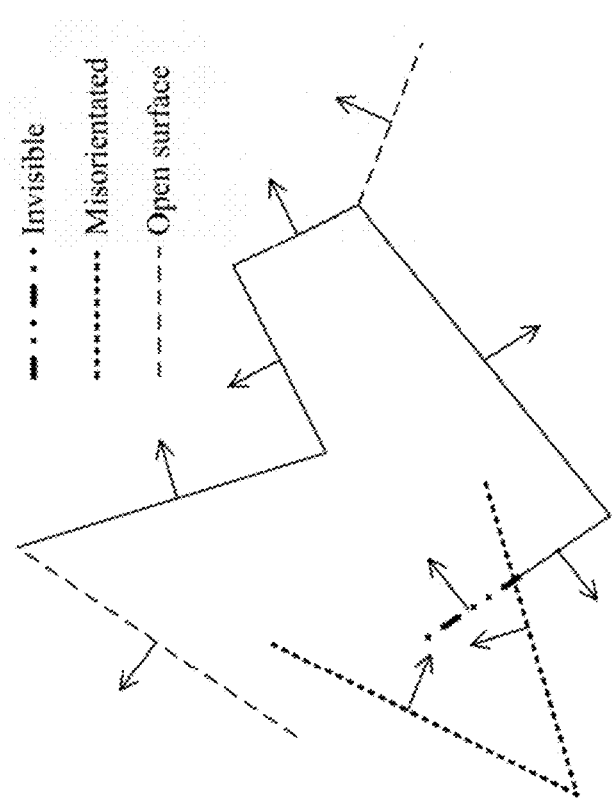
FIGS. 3A-3B show diagrams for illustrating visual measures according to some embodiments of the disclosure.
Figure 3B:
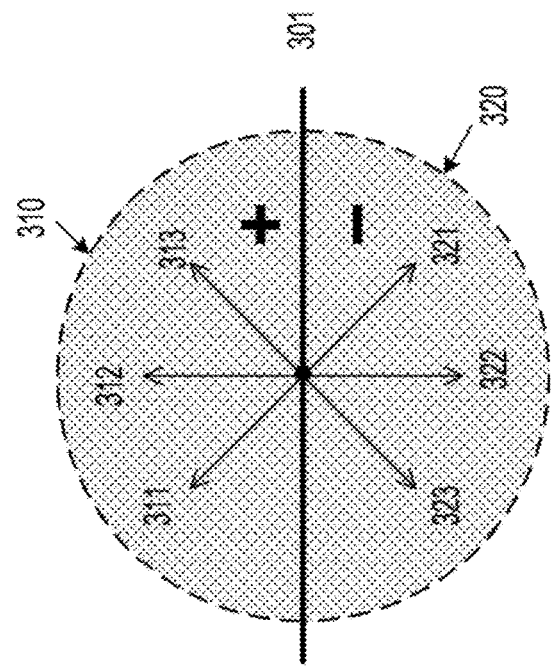

FIGS. 3A-3B show diagrams for illustrating visual measures according to some embodiments of the disclosure. FIG. 3A shows a diagram representing the input mesh $M_{input}$ that is the same as the input mesh $M_{input}$ in FIG. 2A. It is noted the input mesh is shown using a cross-sectional view, lines in the diagram represent faces, and an arrow on a line representing a face indicates a face normal of the face. As shown in FIG. 3A, the input mesh includes invisible faces, mis-orientated faces, and open surfaces.

FIG. 3B shows a diagram for generating rays at a sampling point of a face in an example. In the FIG. 3B example, a face (301) has a positive side (+) and a negative side (−) that can be determined based on the face normal. For a sampling point shown by a solid dot, a first unit hemisphere (310) is centered at the sampling point on the positive side of the face (301), and a second unit hemisphere (320) is centered at the sampling point on the negative side of the face (301). In some examples, on each side, a number of rays are generated in $N_d$ directions on the unit hemisphere. For example, on the positive side, three rays (311)-(313) are generated in three directions; and on the negative side, three rays (321)-(323) are generated in three directions (e.g., $N_d=3$). In some examples, the generated rays can uniformly sample directions in the hemisphere. It is noted that the sampling points may not be the camera position in some examples.

Further, valid rays among the generated rays are determined. A ray is determined to be a valid ray when the ray can hit the bounding box of the input mesh $M_{input}$ within a given number of bounds $N_b$. At location $p \in S^i$, the total number of valid rays for the positive side is denoted by $N_p^+$, and the total number of valid rays for the negative side is denoted by $N_p^-$. Thus, $\sum_{p \in S^i}(N_p^+ + N_p^-) > 0$ means the face $f_{input}^i$ is visible by at least one of the rays.

In some examples, the visibility measure $\Phi_{visibility}$ of a face in a mesh is defined as the probability of the face being visible from outside of the mesh. For example, the visibility measure $\Phi_{visibility}$ of the face $f_{input}^i$ can be calculated according to Eq. (2):

$$\Phi_{visibility}(f_{input}^i) = \frac{\max_{p \in S^i} \max\{N_p^+, N_p^-\}}{N_d} \quad \text{Eq. (2)}$$

In some examples, the face $f_{input}^i$ is considered being visible when $\Phi_{visibility}(f_{input}^i) > 0.5$.

In some examples, the orientation measure $\Phi_{orientation}$ is defined as the probability that the face $f_{input}^i$ is correctly orientated, such as according to Eq. (3):

$$\Phi_{orientation}(f_{input}^i) = \begin{cases} \frac{\sum_{p \in S^i}(N_p^+ - N_p^-)}{\sum_{p \in S^i}(N_p^+ + N_p^-)} & \text{if } \sum_{p \in S^i}(N_p^+ + N_p^-) > 0 \\ 0, & \text{otherwise} \end{cases} \quad \text{Eq. (3)}$$

Thus, $\Phi_{orientation}=-1$ means there is a large chance that the back side (negative side) of the face $f_{input}^i$ is much more visible than the front side (positive side) and the face may be flipped. In some examples, when $\Phi_{orientation}$ is close to $-1$ (e.g., within a predetermined range), there is a large chance that the back side (negative side) of the face $f_{input}^i$ is much more visible than the front side (positive side) and the face may be flipped.

In some examples, a face is considered as an open surface when the face has high visibility from both sides. In an example, the openness measure $\Phi_{openness}$ can be calculated according to Eq. (4):

$$\Phi_{openness}(f_{input}^i) = \begin{cases} \max_{p \in \tilde{S}^i} \frac{\min\{N_p^+, N_p^-\}}{\max\{N_p^+, N_p^-\}} \frac{N_p^+ + N_p^-}{2N_d} & \text{if } \tilde{S}^i \neq \emptyset \\ 0, & \text{otherwise} \end{cases} \quad \text{Eq. (4)}$$

where $\tilde{S}^i \subset S^i$, $\tilde{S}^i$ denotes the visible sampling points of the face. $\Phi_{openness}(f_{input}^i) \in [0,1]$, and a higher openness measure of the face $f_{input}^i$ indicates that the face $f_{input}^i$ is more likely to be an open surface (e.g., also referred to as an open thin shell).

Referring back to FIG. 1, according to an aspect of the disclosure, the orientation adjustment module (120) is configured to adjust orientations of faces based on the orientation measures of the input mesh $M_{input}$ to generate the reorientated mesh $M_{reoriented}$. The orientation adjustment module (120) checks the faces one by one to determine whether the face normal matches with the orientation measure of the face. For example, when the value of the orientation measure of a face is close to $-1$, for example the value of orientation measure of the face is smaller than $-0.5$, the face normal of the face is considered to mismatch with the orientation measure, and the orientation adjustment module (120) can flip the face normal of the face to the opposite direction.

As shown in FIG. 2A and FIG. 2B, the face normal of the mis-oriented faces in the input mesh $M_{input}$ are flipped to the opposite direction in the reoriented mesh $M_{reoriented}$. The orientation adjustment can lead to the better performance of the follow-up operations, such as in a global graph cut stage.

It is noted that in some examples, the orientation adjustment can be performed patch by patch.

In some examples, the orientation adjustment module (120) removes the duplicated faces sharing the same vertices. Then, the orientation adjustment module (120) groups faces into patches $P^j = \{f_{input}^{ji}\}$, for example using a flood fill algorithm, such that faces sharing an edge and having consistent orientations are grouped into a same patch. Then, the orientation adjustment module (120) calculates a weighted average orientation measure over each patch $P^j$, for example according to Eq. (5):

$$\Phi_{orientation}(P^j) = \begin{cases} \dfrac{\sum_{f \in \tilde{P}^j} A(f) \times \Phi_{orientation}(f)}{\sum_{f \in \tilde{P}^j} A(f)} & \text{if } \tilde{P}^j \neq 0 \\ 0, & \text{otherwise} \end{cases} \quad \text{Eq. (5)}$$

where $\tilde{P}^j \subset P^j$ indicates the visible set of faces in the patch $P^j$. Further, the orientation adjustment module (120) can flip a patch $P^j$ (e.g., flip the face normal in the patch) if $\Phi_{orientation}(P^j)<0$.

It is noted that for an open patch, the open patch can have high visibility measures from both sides, thus the value of the orientation measure is close to zero, meaning there is no preference for the orientation for the open patch (or open face). It is also noted that the orientation adjustment module (120) performs orientation adjustment face by face or patch by patch, thus the orientation adjustment is local adjustment.

Referring back to FIG. 1, according to an aspect of the disclosure, the open surface offset module (130) is configured to offset open faces by a small distance, the offset can allow further processing, such as a graph cut algorithm to close the open surface with minimal visual modification. In some related examples, the graph cut algorithm can achieve watertight meshes even without such offset, but the graph cut algorithm can introduce large unnecessary volumes and impair visual appearance due to the open surface.

Figure 4A:
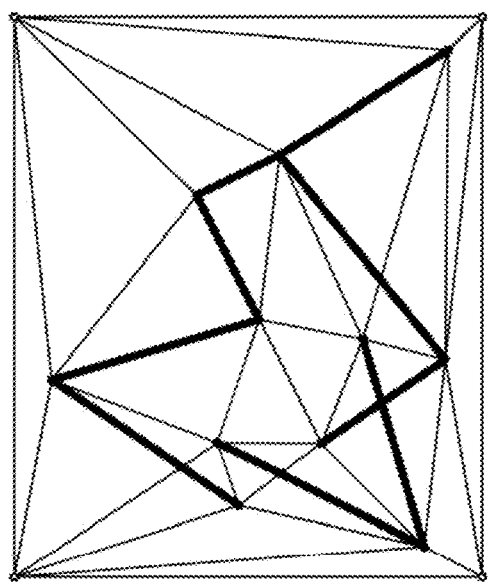
FIGS. 4A-4B show diagrams for illustrating graph cut without offsetting open surface in some examples.
Figure 4B:
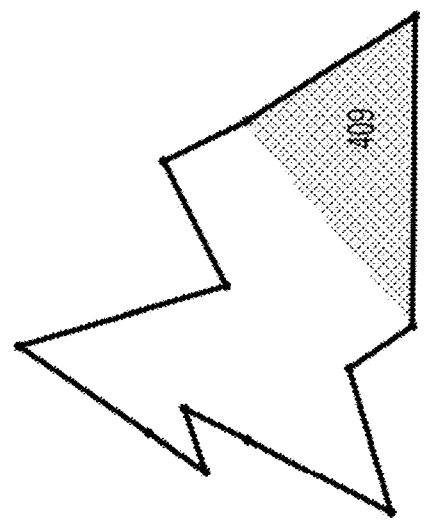

FIGS. 4A-4B show diagrams for illustrating graph cut without offsetting open surface in some examples. FIG. 4A shows a diagram of a partition mesh based on the input mesh $M_{input}$ without offsetting open surface. In an example, lines are edges generated by ambient space partition, for example using tetrahedralization (e.g., Delaunay triangulation) according to vertices in the input mesh $M_{input}$. The input mesh $M_{input}$ is shown by thicker lines in FIG. 4A. The graph cut can be performed on the partition mesh in FIG. 4A to find an interface mesh that is shown in FIG. 4B. As shown in FIG. 4B, due to the open surface, a large piece of unnecessary volume, such as shown by shaded portion (409) in FIG. 4B, exists in the interface mesh.

In some examples, the open surface offset module (130) identifies the open surfaces as guided by the openness measure $\Phi_{openness}$ of faces. For example, the open surface offset module (130) can classify each face $f_{reoriented}^i$ in the reorientated mesh $M_{reoriented}$ as an open surface (also referred to as open face) if $\Phi_{openness}(f_{reoriented})>0.5$.

In some examples, offsetting each open face can create too many volumetric cells for the graph cut algorithm, slowing down the overall performance. In some examples, after open faces are classified, the open surface offset module (130) can group connected, consistent-oriented, open faces into open patches. Further, the open surface offset module (130) can offset the vertices on the patch along the negative normal direction with a distance $d_{offset}$, such as a user-defined distance, to create thin volumetric shells. In some examples, the vertex normal is the average normal of adjacent face normals weighted by the face area.

It is noted that, in the case of non-orientable meshes, such as the Mobius strip, grouping neighboring open faces can end up with non-manifold edges with a zero normal vector. In this case, the open surface offset module (130) can offset vertices on non-manifold edge along each adjacent face normal. The open surface offset module (130) can output of the offset mesh $M_{offset} \triangleq \langle V_{offset}, F_{offset} \rangle$, where $V_{offset}$ denotes a set of vertices and $F_{offset}$ denotes a set of faces in the offset mesh, the offset mesh can include additional vertices and additional edges than the input mesh.

Figure 5B:
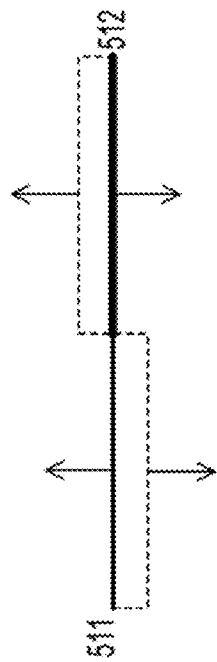
FIGS. 5A-5B show diagrams for offsetting open faces in some examples.
Figure 5A:
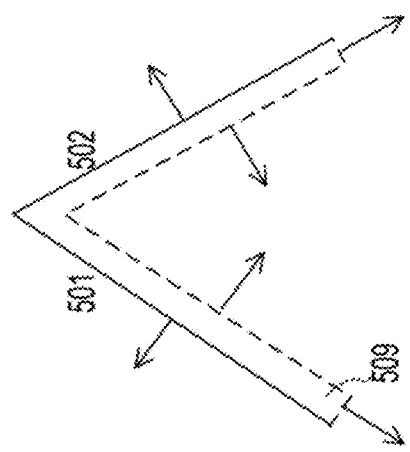

FIGS. 5A-5B show diagrams for offsetting open faces in some examples. In FIG. 5A, a first face (501) and a second face (502) are open faces. The open surface offset module (130) can offset the vertices on the open faces along the negative normal direction with a distance $d_{offset}$, to create a closed thin volumetric shell (509). The offset faces are shown by dashed lines in FIG. 5A. In some examples, the face normal of the offset faces can be determined based on the face normals of the open faces, and the vertex normal of the new vertices can be calculated as the average normal of adjacent face normals weighted by the face areas.

FIG. 5B shows a first face (511) and a second face (512) that are open faces and are grouped in an open patch. The grouping of the first face (511) and the second face (512) can cause a non-manifold edge with zero normal vector. The open surface offset module (130) can offset vertices on non-manifold edge along each adjacent face normal, as shown by the dashed lines in FIG. 5B. The vertices of the non-manifold edge can be offset multiple times along the normal of each adjacent face.

It is noted that after offsetting open faces, the offset mesh $M_{offset}$ can still contain gaps between patches that are not identified as open surfaces.

Referring back to FIG. 1, the space partition module (140) can partition the ambient space into cells (partitions of the space) and the interface mesh extraction module (150) can solve the graph cut problem to find the interface mesh that closes the gaps. The operations of the space partition module (140) and the interface mesh extraction module (150) are referred to as global stages.

In some examples, the space partition module (140) initializes the partitioned mesh via a Delaunay tetrahedralizations (also referred to as Delaunay tetrahedrization in some examples) of the vertex set $V_{offset}$ in the offset mesh $M_{offset}$. The Delaunay tetrahedralizations can be performed based on the bounding box of the input mesh. However, such tetrahedralizations cannot ensure all the input faces are included in $F_{partition}$. In some examples, the space partition module (140) iteratively splits the initial partition mesh using two sets of splitting faces, in the same way as constructing a binary space partitioning (BSP) tree. The first set of splitting faces includes the faces in the $F_{offset}$ of the offset mesh. Including all of $F_{offset}$ in the first set of splitting faces can ensure geometric fidelity. In some examples, the first set is not enough to preserve user-defined surface attributes, such as UV coordinates and material IDs, and the like because certain edges can be shared by two co-planar faces, which are recognized as a single large face by the BSP data structure. In some examples, such edges will be erroneously removed from the data structure by the default BSP construction algorithm. In some examples, when the two neighboring faces have discontinuous surface attributions, the space partition module (140) can cause their shared edge to be included in the BSP data structure. The space partition module (140) can achieve this by using an arbitrary face passing through the edge to split the partition mesh. The arbitrary face passing through the edge is in the second det of splitting faces.

In some embodiments, to make the iterative partition process unconditionally robust while preserving origin geometry, the space partition module (140) can use exact arithmetic during splitting via line-plane intersection (LPI), and three-planes intersection (TPI) for fast exact constructions. The space partition module (140) output the partition mesh $M_{partition}$.

According to an aspect of the disclosure, the space partition module (140) can also preserve surface attribution. In order to preserve the surface attributions, such as UV coordinates, material IDs, the space partition module (140) can maintain a mapping MP: $F_{input} \rightarrow F_{partition}$. In an example, since the space partition module (140) uses exact arithmetic, $MP(f_{partition}^i)$ can be determined by checking whether the barycenter of $f_{partition}^i$ lies exactly on some $f_{input}^j$. Due to the choice of splitting surfaces, the mapping MP is well-defined, i.e., each $f_{partition}^i$ is either contained in some $f_{input}^j$ or does not belong to any face of $F_{partition}$ (e.g., $MP(f_{partition}^i) \triangleq \emptyset$).

The interface mesh extraction module (150) solves the global graph cut to obtain the interface mesh. In some examples, the interface mesh extraction module (150) first refines the face orientation based on $M_{partition}$. Then, the interface mesh extraction module (150) utilizes the visibility measure to classify each face in $F_{partition}$. Further, the visual measures are used to formulate an objective function in the graph cut to determine the interior cells and/or exterior cells, thus the interface surface between the interior cells and the exterior cells can be extracted as the watertight interface mesh $M_{interface}$.

To refine face orientation, the interface mesh extraction module (150) re-orients faces in $F_{partition}$ based on orientation measures of the faces. Specifically, in some examples, the interface mesh extraction module (150) uses a flood fill strategy to group the faces in $F_{partition}$ into patches, such that no patch contains non-manifold edges. Two patches can be merged if they are co-planar, have consistent orientation, and have no non-manifold edge after merging. For example, two patches can be merged if they are co-planar, have consistent orientation, and the connecting edge of the two patches is not non-manifold edge. Then, the interface mesh extraction module (150) reorients each patch based on orientation measures of the patches, such as according to Eq. (5).

FIGS. 6A-6C show diagrams illustrating space partition and patch merging in some examples. FIG. 6A shows an input mesh (610) with two intersected patches. Specifically, a first patch includes two faces (611) and (612), and a second patch includes two faces (613) and (614). The first patch and the second patch intersect.

FIG. 6B shows a partition mesh (620) according to some embodiments of the disclosure. The partition mesh (620) includes a non-manifold edge (630). The first patch is partitioned into faces (621)-(626), and the second patch is partitioned into faces (631-634).

FIG. 6C shows a patch merged mesh (640) according to some embodiments of the disclosure. In the FIG. 6C example, two patches/faces can be merged if they are co-planar, have consistent orientation, and the connecting edge of the two patches/faces is not non-manifold edge. For example, faces (621)-(623) are merged into a first merged patch; faces (624)-(626) are merged into a second merged patch; faces (631) and (632) are merged into a third merged patch; and faces (633) and (634) are merged into a fourth merged patch.

According to an aspect of the disclosure, faces in the $F_{partition}$ can be classified into three groups, such as a first group of visible faces denoted by $F_{partition}^{visible}$, a second group of invisible faces denoted by $F_{partition}^{invisible}$ and a third group of extra faces denoted by $F_{partition}^{extra}$. In some examples, the three groups in face classification can be defined according to Eq. (6)-Eq. (8):

$$F_{partition}^{visible} \triangleq \{f \in F_{partition} \text{ is visible } \wedge MP(f) \neq \emptyset\} \quad \text{Eq. (6)}$$

$$F_{partition}^{invisible} \triangleq \{f \in F_{partition} \text{ is invisible } \wedge MP(f) \neq \emptyset\} \quad \text{Eq. (7)}$$

$$F_{partition}^{extra} \triangleq F_{partition} - F_{paertition}^{visible} - F_{partition}^{invisible} \quad \text{Eq. (8)}$$

In some examples, the watertight interface surface (for determining the interface mesh) is formed using as many visible faces and as few extra faces as possible.

In some examples, the interface mesh extraction module (150) can classify the cells (e.g., space partitions) as interior cells (within the interface mesh) or exterior cells (out of the interface mesh). For examples, the interface mesh extraction module (150) can treat each cell in the BSP tree as a node in graph G that can be labeled as either interior or exterior. Each facet of a cell corresponds to an edge in G, but no edge is created for mappable faces ($MP(f_{partition}^i) \neq \emptyset$), no matter whether the face is visible or invisible.

Figure 7A:
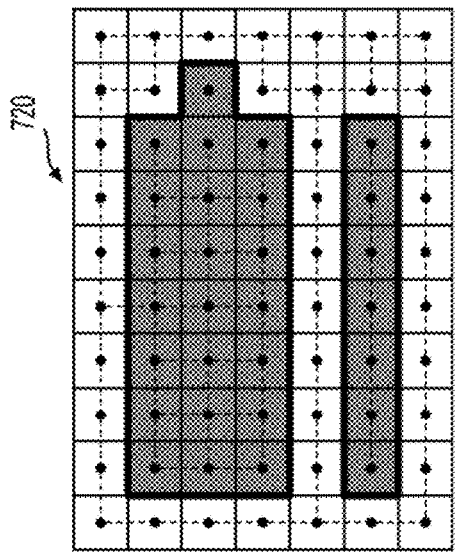
FIGS. 7A-7D show diagrams illustrating graph cut in some examples.

FIGS. 7A-7D show diagrams illustrating graph cut in some examples. FIG. 7A shows a diagram of a graph G (710) in some examples. Black dots in FIG. 7A respectively represent cells that are nodes in the graph G, and dashed lines in FIG. 7A represent edges between cells. Further, in FIG. 7A, thicker solid lines represent visible faces, and thickest solid lines represent invisible faces. It is noted that there is no edge over the visible faces and the invisible faces.

Figure 7B:
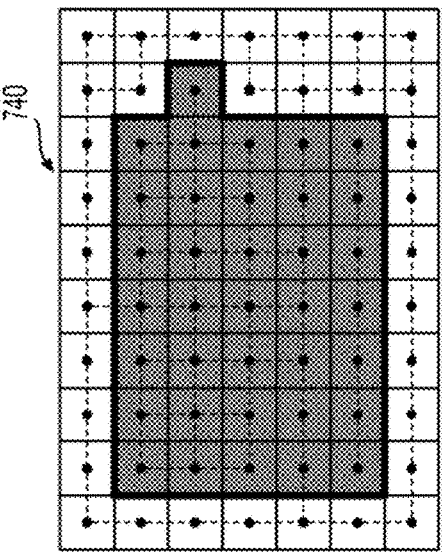

FIG. 7B shows a diagram of a graph G (720) after solving the graph cut of the graph G (710). The extracted mesh is shown by the shaded portion in FIG. 7B.

It is noted that edges over the visible faces and the invisible faces can cause errors in the extracted mesh.

Figure 7C:
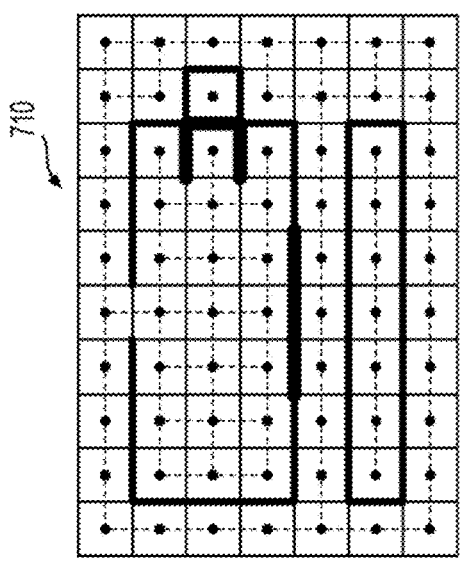

FIG. 7C shows a diagram of a graph G (730) with edges across invisible faces. The graph G (730) is similar to the graph G (710) except the edges across invisible faces.

Figure 7D:
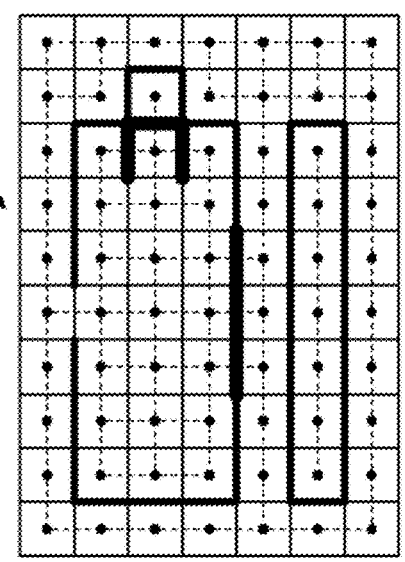

FIG. 7D shows a diagram of a graph G (740) after solving the graph cut of the graph G (730). The extracted mesh is shown by the shaded portion in FIG. 7D. The extracted mesh in FIG. 7D erroneously closes the entire mesh due to the edges across invisible faces.

According to an aspect of the disclosure, the faces bordering the interior cells and exterior cells are guaranteed to form a watertight mesh. In some examples, the interface mesh extraction module (150) can solve a minimum graph cut problem for a set of cell labels $l^i$ (L) to produce the interface mesh that maximizes the use of visible faces while minimizing extra faces. The minimum graph cut problem can be formulated according to Eq. (9):

$$\text{COST}(L) = \sum_{i} D(l^i) + \sum_{e^{ij}} S(l^i, l^j) \quad \text{Eq. (9)}$$

where $l^i \in \{I, E\}$ indicates the ith cell $c^i$ to be labeled as either interior cell (denoted by I) or exterior cell (denoted by E).

As shown in Eq. (9), the cost is calculated as a sum of a first portion and a second portion. The first portion is further formulated as in Eq. (10):

$$D(l^i) = \begin{cases} \sum_{f \subset c^i \wedge f \in F_{partition}^{visible} \wedge f \text{ has inward normal}} A(f) & \text{if } l^i = I \\ \sum_{f \subset c^i \wedge f \in F_{partition}^{visible} \wedge f \text{ has outward normal}} A(f) & \text{if } l^i = E \end{cases} \quad \text{Eq. (10)}$$

In Eq. (10), $D(l^i)$ penalizes incorrectly oriented faces. If a cell $c^i$ is chosen to be interior, then its visible faces should have normal facing outward, and if a visible face has normal facing inward, the first portion can include the area of the visible face for penalty. Similarly, if a cell $c^i$ is chosen to be exterior, then its visible faces should have normal facing inward and if a visible face has normal facing outward, the first portion can include the area of the visible face for penalty.

In Eq. (9), the second portion of the cost penalizes the use of any extra faces, the second portion is defined as in Eq. (11):

$$S(l^i, l^j) = \begin{cases} A(f), & \text{if } f \subset c^i \cap c^j \wedge f \in F_{partition}^{extra} l^i \neq l^j \\ 0, & \text{otherwise} \end{cases} \quad \text{Eq. (11)}$$

It is noted that as long as a condition in Eq. (12) holds, the problem of binary graph cut has a polynomial complexity.

$$S(I, I) + S(E, E) \leq S(I, E) + S(E, I) \quad \text{Eq. (12)}$$

The condition in Eq. (12) holds as $S(I, I)=S(E, E)=0$ and $S(I, E)=S(E, I)\geq 0$. The output of the interface mesh extraction module (150) is denoted as interface mesh $M_{interface}$.

According to an aspect of the disclosure, the global repair portion (103) can guarantee a watertight output, and can also incur many redundant, small facets. The post repair processing portion (104) includes the constrained simplification module (160) configured to perform constrained mesh simplification to reduce $M_{interface}$. In some examples, the constrained simplification module (160) can detect the geometric and UV patch boundaries and then re-triangulate each patch to reduce the face number, while comply with detected boundaries.

Specifically, there are two types of boundaries the constrained simplification module (160) can preserve during the simplification. The first type is the geometric boundaries. The constrained simplification module (160) can use a flood fill strategy to group co-planar faces with consistent orientation from $F_{interface}$ and extract the boundary of each group as the geometry boundary. Additionally, the constrained simplification module (160) traverses all edges in $M_{input}$ and find all UV patch boundaries.

It is noted that although these UV boundaries are preserved during partition, these UV boundaries may be split into segments and only parts of them are in $M_{interface}$ after mesh extraction. The constrained simplification module (160) can use the intersection between the origin UV boundaries and the geometric boundaries of each group to find these segments, which uses the rational number to ensure accuracy.

Further, the constrained simplification module (160) performs constrained triangulation. The constrained triangulation complies with the detected geometry and texture boundaries (geometric and UV patch boundaries). The constrained simplification module (160) can first use edge-collapse to remove any vertex whose degree is two or adjacent to co-linear edges and check for face intersection before collapse operation to prevent any self-intersection.

In some examples, the constrained simplification module (160) can check if the resulting faces intersect with all other faces within the extended bounding box of $P_i$ with extended length $l_{extended}$ before each ear-cut operation. Then, the constrained simplification module (160) can use the constrained ear-cut triangulation that obeys geometry and texture boundaries. After triangulation, the constrained simplification module (160) can get the simplified mesh $M_{simplified}$ with much fewer faces and vertices.

According to an aspect of the disclosure, the interface mesh $M_{interface}$ is watertight 3-manifold, and may include non-manifold edges and vertices. The constrained simplification module (160) can split the non-manifold edges and vertices to recover manifoldness. Since the edge-collapse and triangulation produce edges with an even number of adjacent triangles, the simplified $M_{simplified}$ can be guaranteed to be watertight and manifold mesh.

According to another aspect of the disclosure, there are three types of faces in $F_{simplified}$: inherited faces from $F_{input}$, offset faces due to open surface offset, and extra faces defined in Eq. (8). The constrained simplification module (160) can recover inherited faces' attributes from $M_{input}$ using barycentric interpolation. The offset faces' attributes are copied from their original faces. In some examples, most faces can be traced back to their original faces. However, some extra faces are created for closing holes and gaps. To assign surface attributes, the constrained simplification module (160) can perform a flood fill and iteratively set the attributes of extra faces by averaging from their one-ring neighboring vertices.

In some implementation examples, the mesh repair pipeline (101) is implemented in software, such as in C++ language. In some examples, the visual measure calculation module (110) can be implemented as software instructions executed on hardware processing units. In an example, the visual measure calculation module (110) can be implemented using a ray tracing application programming interface (API), such as Optix to compute visual metrics via ray tracing on GPU. In some examples, the graph cut can be solved by a fast approximate energy minimization solver. In some examples, experiments are performed on the electronic device (100), such as a computer with an AMD Ryzen Threadripper 3970X, 32-Core Processor at 3.69 GHz and 256 GB RAM. The experiments use an input dataset that includes 500 randomly chosen models from ShapeNet. The experiments use $N_{total}=2e7$ which is sufficiently large for over-sampling all the models in the input dataset, and $N_{min}=5$ for good coverage of mesh surface, and $N_d=5$ directions on the unit hemisphere for both sides of $f_{input}^j$. Each ray has a maximum bounce number $N_b=10$. For the ear-cut triangulation used in constrained simplification, an extension distance is required and set to $l_{extended}=D/1000$, with D being the diagonal length of the model's bounding box.

According to an aspect of disclosure, due to the stochastic nature of ray-tracing, the mesh repair pipeline (101) may be sensitive to the sample density in visual measure computation. The sensitivity can be most obvious when a surface is open by a small hole. Experiments of an ablation study are performed on the hole size.

Figure 8A:
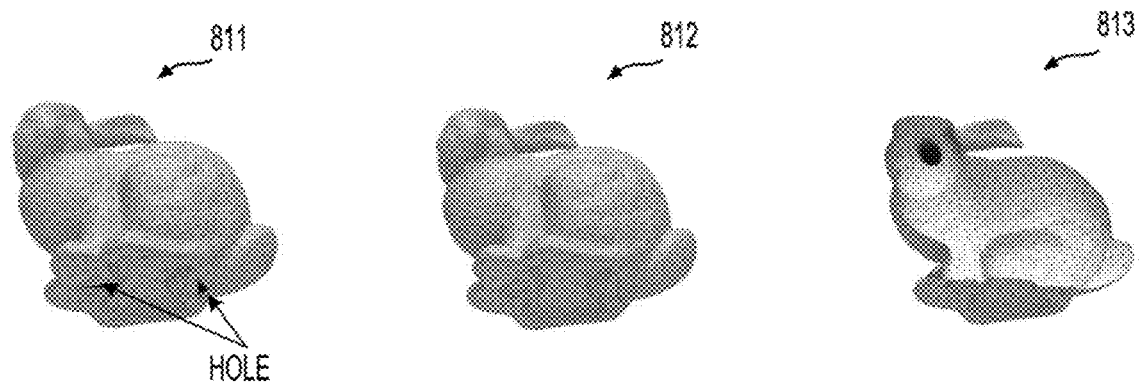
FIGS. 8A-8C show diagrams of the ablation study on hole size in an example.
Figure 8B:
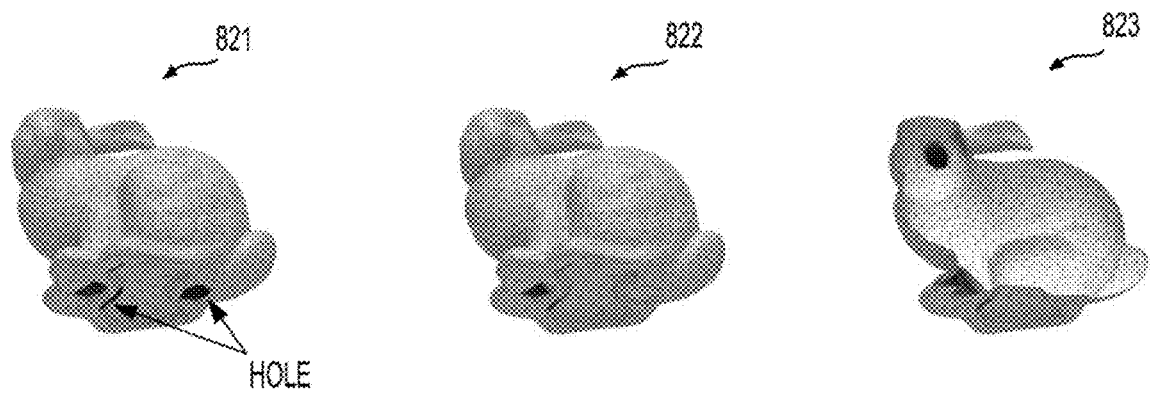
Figure 8C:
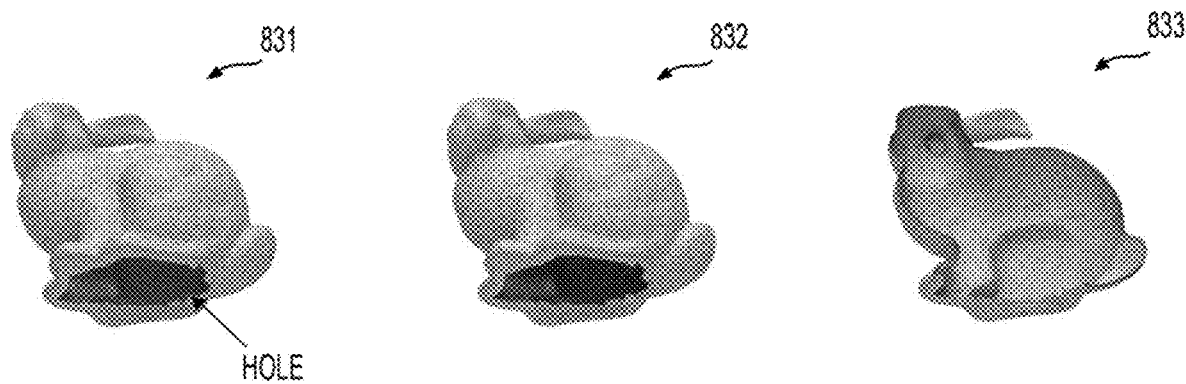

FIGS. 8A-8C show diagrams of the ablation study on hole size in an example. The hole size in a model, such as a bunny model, increases in the ablation study. FIG. 8A uses small hole size, FIG. 8B uses media hole size, and FIG. 8C uses large hole size. FIG. 8A shows an input mesh (811) of the bunny model, an output mesh (812) from the mesh repair pipeline (101), and a cut view (813) of the output mesh (812) when small hole size is used. FIG. 8B shows an input mesh (821) of the bunny model, an output mesh (822) from the mesh repair pipeline (101), and a cut view (823) of the output mesh (822) when medium hole size is used. FIG. 8C shows an input mesh (831) of the bunny model, an output mesh (832) from the mesh repair pipeline (101), and a cut view (833) of the output mesh (832) when large hole size is used. As shown by FIGS. 8A-8C, a small hole size leads to the closure of the hole, as there are insufficient rays shot from the interior of the bunny to identify any face as an open surface. As the hole size increases, more faces are progressively identified as open, leading to their filling by the mesh repair pipeline (101), ultimately forming a thin shell.

According to another aspect of the disclosure, the mesh repair pipeline (101) may be sensitive to the offset distance $d_{offset}$, experiments of an ablation study are performed on the different offset distance $d_{offset}$.

FIGS. 9A-9D show diagrams of the ablation study on offset distance $d_{offset}$ in an example based on a flower model. FIG. 9A shows an input mesh (910) and a detail view (911) of a portion of the input mesh (910). As when by FIG. 9A, the flower model includes numerous open faces. FIG. 9B shows an output mesh (920) by using $d_{offset}=D/20000$ and a detail view (921) of a portion of the output mesh (920). The Hausdorff distance (HD) is 6.9e-3, and the light field distance (LFD) is 86 in FIG. 9B. FIG. 9C shows an output mesh (930) by using $d_{offset}=D/2000$ and a detail view (931) of a portion of the output mesh (930). The Hausdorff distance (HD) is 6.8e-3, and the light field distance (LFD) is 86 in FIG. 9C. FIG. 9D shows an output mesh (940) by using $d_{offset}=D/200$ and a detail view (941) of a portion of the output mesh (940). The Hausdorff distance (HD) is 7.1e-3, and the light field distance (LFD) is 520 in FIG. 9D.

As demonstrated by FIGS. 9B-9D, the mesh repair pipeline (101) can robustly convert the input model with hundreds of open faces to a watertight manifold mesh, where the Hausdorff distance (HD) between output and input meshes is controlled by $d_{offset}$. The light field distance can be controlled by adjusting $d_{offset}$.

In some examples, the mesh repair pipeline (101) is compared with 7 related algorithm examples (referred to as related 1 to related 7) on randomly chosen 500 models from ShapeNet.

FIG. 10 shows a table comparing statistics of the 7 related algorithm examples with the mesh repair pipeline (101) based on randomly chosen 500 models from ShapeNet. The statistics include the percentage of results that are watertight and manifold, respectively, and average face number, HD, LFD, PSNR, peak memory, and time usage. Smaller values are more desired for all listed numerical metrics except PSNR. * indicates PNSR of the mesh repair pipeline (101) with UVs, while all other related algorithm examples do not have UVs.

FIGS. 11A-11I show meshes of a chair model in some examples. FIG. 11A shows an input mesh of the chair model; FIG. 11B shows an output mesh of the chair model by related 1, the output mesh has 2K faces, 0.10 HD, 16882 LFD and 25.0 PSNR; FIG. 11C shows an output mesh of the chair model by related 2, the output mesh has 0K faces, 0.50 HD, 60968 LFD and 23.5 PSNR; FIG. 11D shows an output mesh of the chair model by related 3, the output mesh has 8K faces, 0.12 HD, 15868 LFD and 23.8 PSNR; FIG. 11E shows an output mesh of the chair model by related 4, the output mesh has 25K faces, 0.01 HD, 4346 LFD and 26.8 PSNR; FIG. 11F shows an output mesh of the chair model by related 5, the output mesh has 14K faces, 0.01 HD, 3484 LFD and 30.8 PSNR; FIG. 11G shows an output mesh of the chair model by related 6, the output mesh has 125K faces, 0.03 HD, 2368 LFD and 31.8 PSNR; FIG. 11H shows an output mesh of the chair model by related 7, the output mesh has 66K faces, 0.01 HD, 3492 LFD and 30.8 PSNR; and FIG. 11I shows an output mesh of the chair model by the mesh repair pipeline (101), the output mesh has 20K faces, 0.01 HD, 6 LFD and 51.4 PSNR.

Figure 12A:
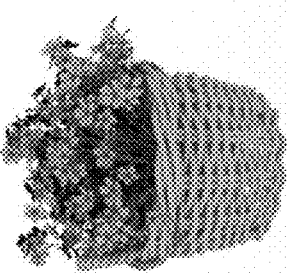
FIGS. 12A-12I show meshes of a flower model in some examples.
Figure 12B:
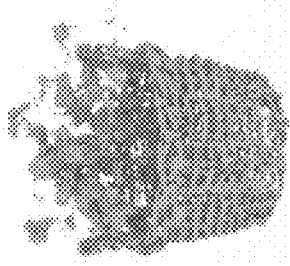
Figure 12C:
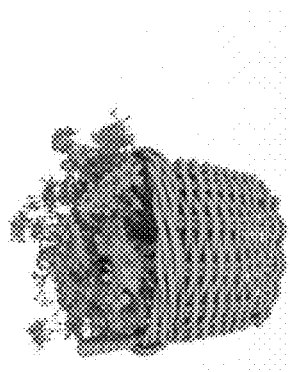
Figure 12D:
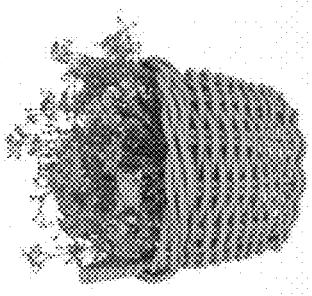
Figure 12E:
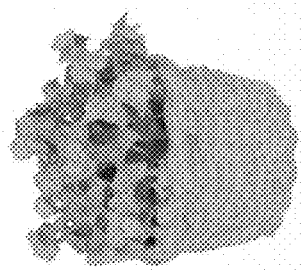
Figure 12F:
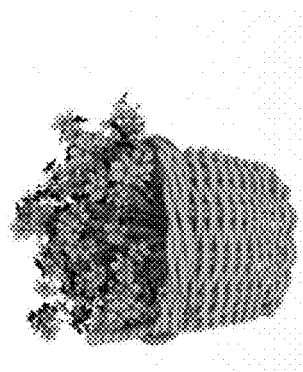
Figure 12G:
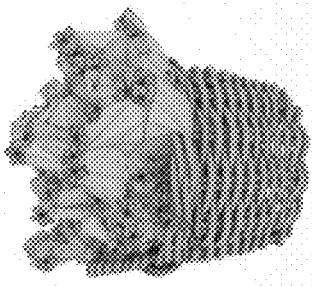
Figure 12H:
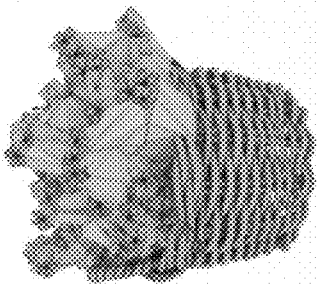
Figure 12I:
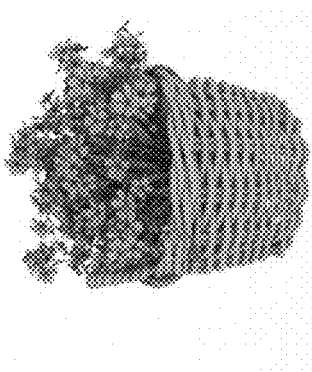

FIGS. 12A-12I show meshes of a flower model in some examples. FIG. 12A shows an input mesh of the flower model; FIG. 12B shows an output mesh of the flower model by related 1, the output mesh has 44K faces, 0.05 HD, 2534 LFD and 23.7 PSNR; FIG. 12C shows an output mesh of the flower model by related 2, the output mesh has 409K faces, 0.03 HD, 1068 LFD and 24.5 PSNR; FIG. 12D shows an output mesh of the flower model by related 3, the output mesh has 312K faces, 0.03 HD, 1662 LFD and 24.3 PSNR; FIG. 12E shows an output mesh of the flower model by related 4, the output mesh has 99K faces, 0.02 HD, 898 LFD and 25.7 PSNR; FIG. 12F shows an output mesh of the flower model by related 5, the output mesh has 640K faces, 0.01 HD, 0 LFD and 22.7 PSNR; FIG. 12G shows an output mesh of the flower model by related 6, the output mesh has 1316K faces, 0.04 HD, 1482 LFD and 27.4 PSNR; FIG. 12H shows an output mesh of the flower model by related 7, the output mesh has 1794K faces, 0.04 HD, 1492 LFD and 27.4 PSNR; and FIG. 12I shows an output mesh of the flower model by the mesh repair pipeline (101), the output mesh has 1483K faces, 0.01 HD, 12 LFD and 45.3 PSNR.

Figure 13A:
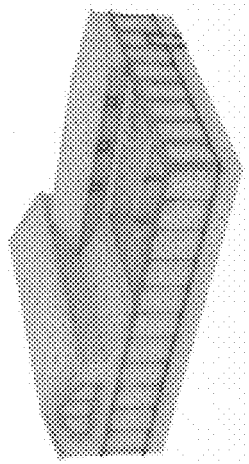
FIGS. 13A-13I show meshes of a Roman model in some examples.
Figure 13B:
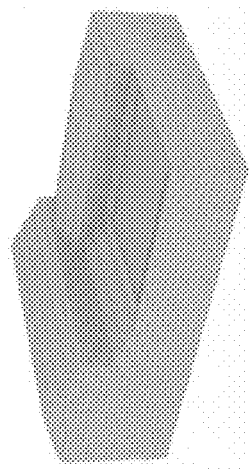
Figure 13C:
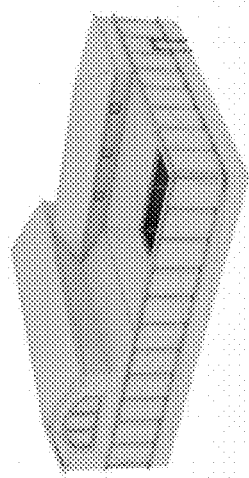
Figure 13D:
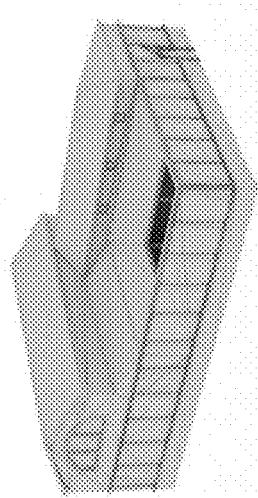
Figure 13E:
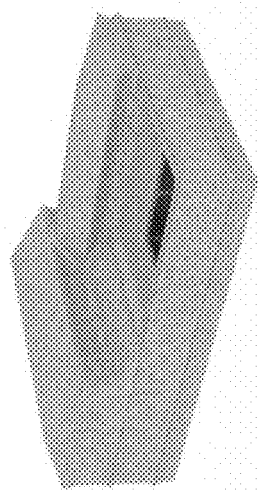
Figure 13F:
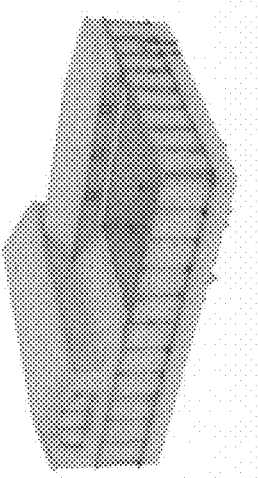
Figure 13G:
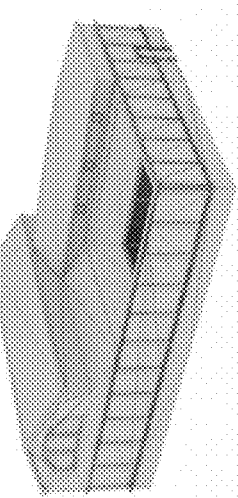
Figure 13H:
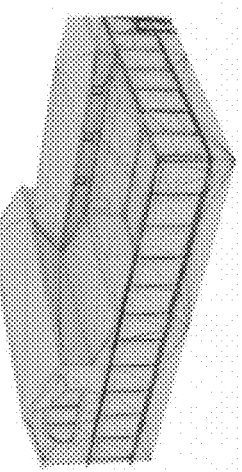
Figure 13I:
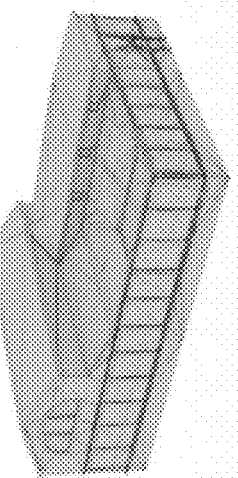

FIGS. 13A-13I show meshes of a Roman model in some examples. FIG. 13A shows an input mesh of the Roman model; FIG. 13B shows an output mesh of the Roman model by related 1, the output mesh has 18K faces, 0.09 HD, 450 LFD and 25.8 PSNR; FIG. 13C shows an output mesh of the Roman model by related 2, the output mesh has 46K faces, 0.02 HD, 954 LFD and 28.1 PSNR; FIG. 13D shows an output mesh of the Roman model by related 3, the output mesh has 46K faces, 0.02 HD, 632 LFD, and 23.9 PSNR; FIG. 13E shows an output mesh of the Roman model by related 4, the output mesh has 53K faces, 0.02 HD, 44 LFD, and 33.9 PSNR; FIG. 13F shows an output mesh of the Roman model by related 5, the output mesh has 12K faces, 0.003 HD, 0 LFD, and 31.9 PSNR; FIG. 13G shows an output mesh of the Roman model by related 6, the output mesh has 32K faces, 0.05 HD, 2 LFD, and 38.8 PSNR; FIG. 13H shows an output mesh of the Roman model by related 7, the output mesh has 35K faces, 0.05 HD, 4 LFD, and 38.9 PSNR; and FIG. 13I shows an output mesh of the Roman model by the mesh repair pipeline (101), the output mesh has 14K faces, 0.01 HD, 0 LFD, and 49.6 PSNR.

FIGS. 14A-14I show meshes of a skyscraper model in some examples. FIG. 14A shows an input mesh of the skyscraper model; FIG. 14B shows an output mesh of the skyscraper model by related 1, the output mesh has 19K faces, 0.02 HD, 684 LFD and 23.5 PSNR; FIG. 14C shows an output mesh of the skyscraper model by related 2, the output mesh has 249K faces, 0.02 HD, 360 LFD and 28.4 PSNR; FIG. 14D shows an output mesh of the skyscraper model by related 3, the output mesh has 187K faces, 0.02 HD, 730 LFD, and 28.8 PSNR; FIG. 14E shows an output mesh of the skyscraper model by related 4 with 23K faces, 0.02 HD, 58 LFD, and 31.6 PSNR; FIG. 14F shows an output mesh of the skyscraper model by related 5 with 304K faces, 0.02 HD, 0 LFD, and 30.5 PSNR; FIG. 14G shows an output mesh of the skyscraper model by related 6, the output mesh has 1734K faces, 0.01 HD, 154 LFD, and 32.5 PSNR; FIG. 14H shows an output mesh of the skyscraper model by related 7, the output mesh has 1936K faces, 0.01 HD, 250 LFD, and 31.0 PSNR; and FIG. 14I shows an output mesh of the skyscraper model by the mesh repair pipeline (101), the output mesh has 634K faces, 0.02 HD, 0 LFD, and 36.1 PSNR.

Figure 15J:
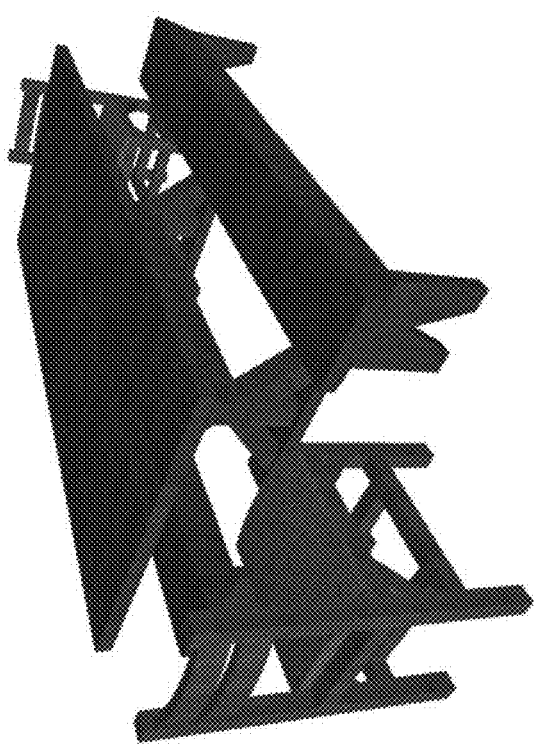

FIGS. 15A-15J show meshes of a table model in some examples. FIG. 15A shows an input mesh of the table model; FIG. 15B shows an output mesh of the table model by related 1 with 9K faces, 0.05 HD, 4158 LFD, and 22.3 PSNR; FIG. 15C shows an output mesh of the table model by related 2 with OK faces, 0.29 HD, 51862 LFD, and 19.9 PSNR; FIG. 15D shows an output mesh of the table model by related 3 with 7K faces, 0.12 HD, 5074 LFD, and 22.3 PSNR; FIG. 15E shows an output mesh of the table model by related 4 with 40K faces, 0.01 HD, 162 LFD, and 31.8 PSNR; FIG. 15F shows an output mesh of the table model by related 5 with 2K faces, 0.001 HD, 0 LFD, and 23.3 PSNR; FIG. 15G shows an output mesh of the table model by related 6 with 6K faces, 0.04 HD, 2484 LFD, and 26.4 PSNR; FIG. 15H shows an output mesh of the table model by related 7 with 8K faces, 0.03 HD, 400 LFD, and 32.6 PSNR; FIG. 15I shows an output mesh of the table model by the mesh repair pipeline (101) with 2K faces, 0.001 HD, 0 LFD, and 56.5 PSNR; and FIG. 15J shows an output mesh of the table model (with texture) by the mesh repair pipeline (101) with 2K faces, 0.001 HD, 0 LFD, and 51.5 PSNR.

According to an aspect of the disclosure, the mesh repair pipeline (101) can guarantee a watertight and manifold output. The related 5 may not fill gaps and holes. The related 2 and related 6 can only ensure a 3-manifold output that may contain non-manifold edges. Moreover, the output mesh of the related 6 is unnecessarily complex due to BSP partitioning, resulting in tripling the number of faces in the input mesh. The mesh repair pipeline (101) can use constrained simplification to significantly reduce the face count to approximately the same level as the input mesh.

In some examples, qualitative metrics, such as Hausdorff distance (HD), light-field distance (LFD), and peak signal-to noise ratio (PSNR), are used to evaluate the output quality in comparison to the input mesh. In an example, the input mesh is rendered with double face rendering as the reference and the output meshes by the related examples and the mesh repair pipeline (101) are rendered with single face colored in black. Due to misorientation of the input mesh, related examples that rely on input orientations to determine the interior and exterior, such as related 1, related 2, related 3 and related 6, cannot produce a result even close to the input mesh. Additionally, the flower model in FIGS. 12A-12I demonstrates that related 6 might close the surface with lots of unnecessary volumes for the open faces. The related 6 also fails to close the court due to the open surface under the eave in the Roman model as shown in FIG. 13G, and related 6 solves for the smallest surface area, which might close the concave structure.

FIGS. 14A-14I show that the related 6, the related 2, and the related 3 have difficulty handling the skyscraper model with inner structures. On the other hand, the related 4 does not require consistent orientation, can suffer from blurring of input geometric details and sharp features if the surface is offset by a large distance, as shown by FIG. 14E.

The related 1 may fail to preserve sharp features due to limited octree resolution, such as shown by FIG. 11B. One reason is that visual measures in the related 1 are based on rasterization, which may not capture small or occluded faces accurately, such as the frames on the chair model in FIG. 11B.

Figure 16A:
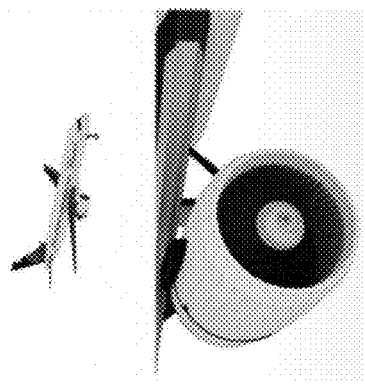
FIGS. 16A-16H show meshes of an airplane model with zoom-in view of engine details in some examples.
Figure 16B:
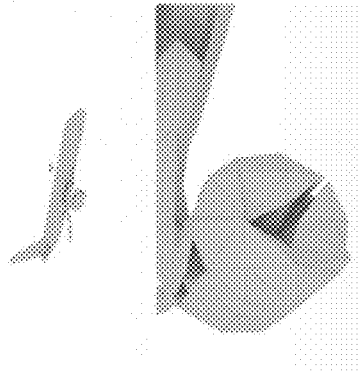
Figure 16C:
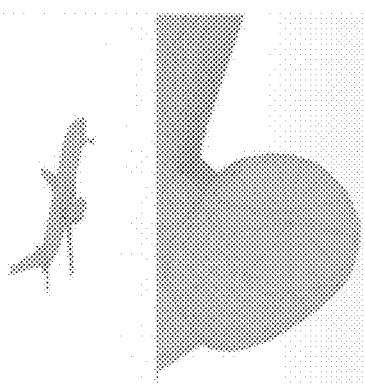
Figure 16D:
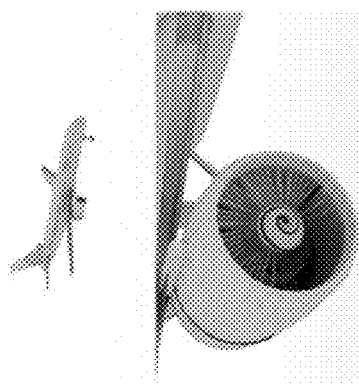
Figure 16E:
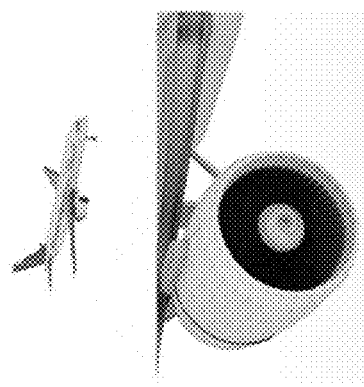
Figure 16F:
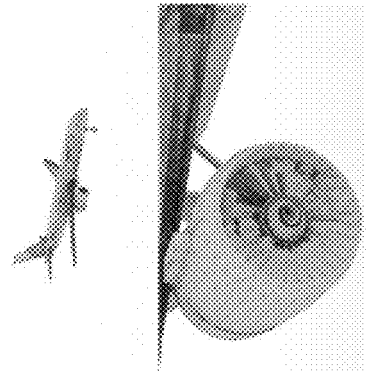
Figure 16G:
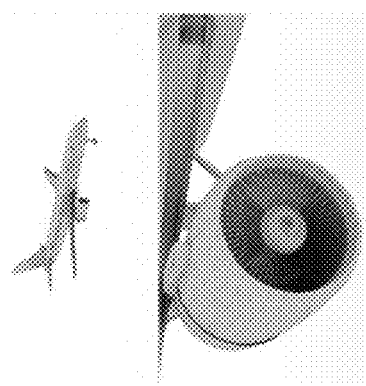
Figure 16H:
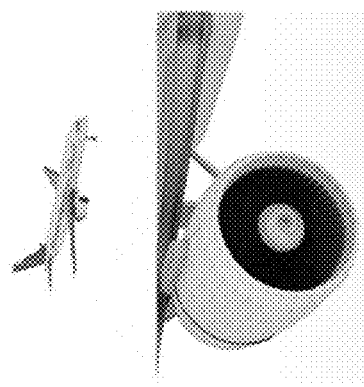

FIGS. 16A-16H show meshes of an airplane model with zoom-in view of engine details in some examples. FIG. 16A shows an input mesh of the airplane model; FIG. 16B shows an output mesh of the table model by related 1; FIG. 16C shows an output mesh of the table model by related 4; FIG. 16D shows an output mesh of the table model by related 5; FIG. 16E shows an output mesh of the table model by related 6; FIG. 16F shows an output mesh of the table model by related 7; FIG. 16G shows an output mesh of the table model by the mesh repair pipeline (101); and FIG. 16H shows an output mesh of the table model (with texture) by the mesh repair pipeline (101).

As shown by FIG. 16B, the related 1 may not capture small or occluded faces accurately.

In some examples, although the related 5 scores well in HD and LFD, its optimization cannot ensure correct patch orientation across the entire mesh, resulting in a low PSNR score.

According to an aspect, the mesh repair pipeline (101) can outperform the related examples in terms of HD, LFD and PSNR. In addition, unlike other methods, the mesh repair pipeline (101) can close the holes and propagate UV for the newly added faces from neighboring faces.

Figure 17:
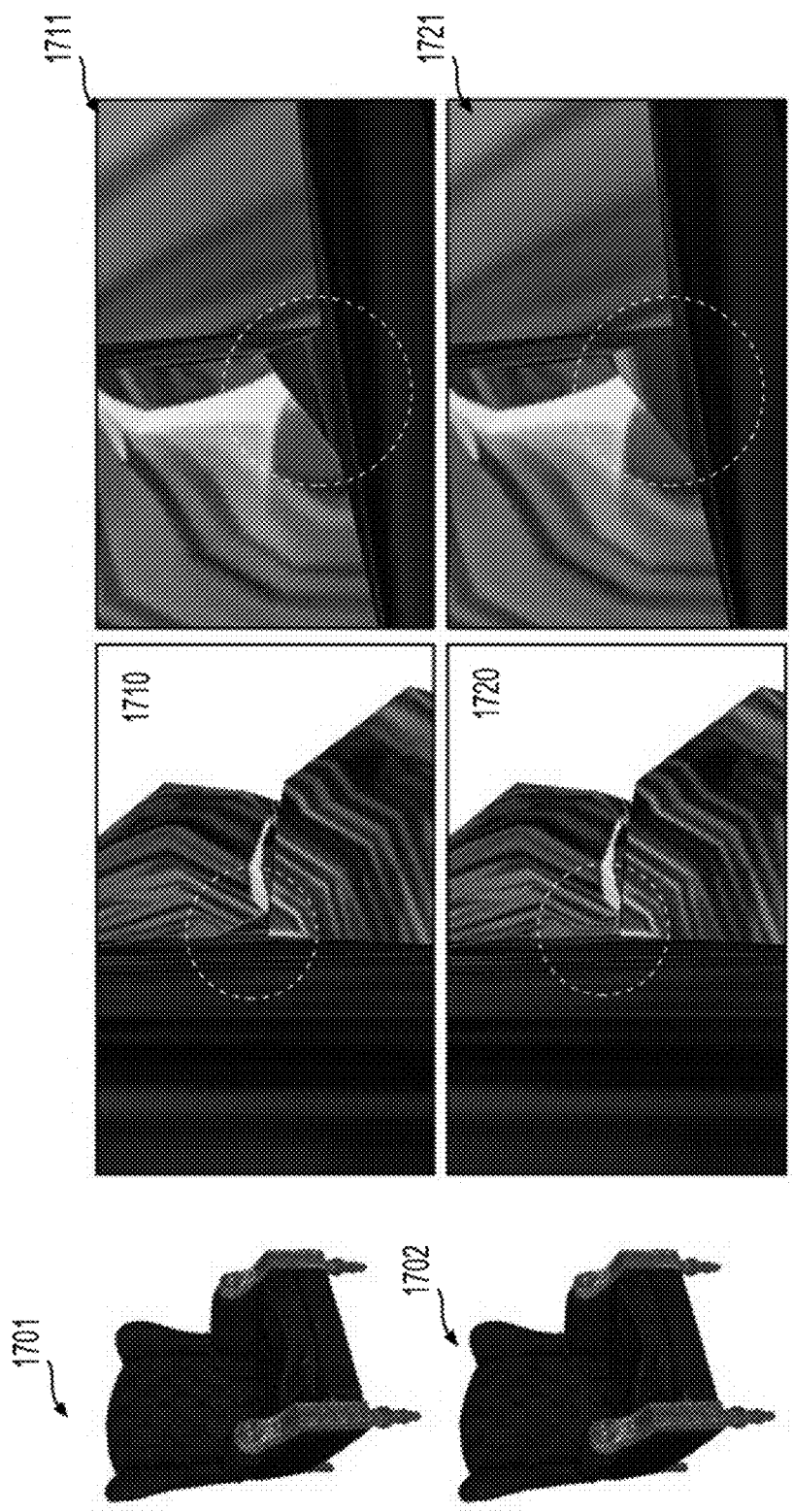
FIG. 17 shows an example of UV recovering in an example.

FIG. 17 shows an example of UV recovering in an example. In the FIG. 17 example, the input mesh (1701) includes a portion (1710) that has a portion as shown by a zoom-in view (1711). Further, in FIG. 17, the output mesh (1702) includes a portion (1720) corresponding to the portion (1710) in the input mesh (1701). As shown by a zoom-in view (1721), the hole is closed and UV of the closed hole is recovered by propagating UV from neighboring faces.

According to an aspect of the disclosure, memory and time usage of the related examples and the mesh repair pipeline (101) are analyzed. Due to offset faces and extra cuts for boundary edges, the mesh repair pipeline (101) may need more memory and computational time than some related examples, such as the related 6. It is noted that related 5 uses visual information from the rasterization pipeline, the visual measure calculation based on ray tracing in the present disclosure is more efficient than the related 5, in which reading back results from the rasterization pipeline causes the CPU/GPU to get stuck and easily takes hours for large models.

In some examples, the time breakdown of the mesh repair pipeline (101) are studies. The partition takes 32.7% of the total time, boundary detection takes 31.7% of the total time (e.g., due to using rational numbers), graph cut takes 22.6% of the total time, ray tracing takes 7.35% of the total time, triangulation takes 2.56% of the total time, UV and topology takes 1.98% of the total time, a preprocessing step takes 1.09% of the total time.

The related 7 combines a first technique that is referred to as volume mesher and used in the related 6 and a second technique that is referred to as visual repair and used in the related 5. The volume mesher is a volumetric approach that can generate a manifold mesh without holes, yet the volume mesher relies on correct input orientation. In contrast, visual repair can adjust orientation but is unable to fill gaps. The related 7 uses visual repair to orientate the faces and uses volume mesher to mend the topology.

The related 7 can perform better in PSNR than for example the related 5 and related 6. Nevertheless, the resulting mesh from the related 7 contains numerous faces due to the additional face division caused by visual repair. Furthermore, the mesh repair pipeline (101) achieves a 9.2 PSNR advantage over the related 7. The mesh repair pipeline (101) incorporates visual guidance throughout the entire repair process and optimization procedure. On the other hand, the related 7 only applies the visual metric to the surface optimization step, i.e., the graph cut stage and thus has not fully exploited the critical visual cues. For instance, in the example of processing the chair model as shown by FIG. 11H, since the rasterization cannot capture tiny faces, visual repair cannot correct all face orientations, which leads to incorrect output from volume mesher. The same issue can be observed in FIG. 16F as well.

For the example of processing the table model by the related 6 shown by FIG. 15G and by the related 7 shown by FIG. 15H, both related 6 and the related 7 discard part of the table because the graph cut in volume mesher solves for the minimal surface area, which is not always the case.

According to an aspect of the disclosure, regarding handling holes, although the mesh repair pipeline (101) closes the hole and converts the large open surface into a thin shell by default in some examples, the mesh repair pipeline (101) also allows users to specify the open boundary to be preserved during the repair in some examples.

FIG. 18 shows an input mesh (1810) and an output mesh (1820) output from the mesh repair pipeline (101) in an example. Particularly, the mesh repair pipeline (101) can first close the hole and mark all corresponding faces. After repair, all marked faces are removed to recover the boundary.

The mesh repair pipeline (101) can be used in various applications. In some examples, the mesh repair pipeline (101) is used in mesh simplifications, Boolean operations on meshes, geodesic distance computation, and fluid simulation.

FIGS. 19A and 19B show examples of mesh simplifications in some examples. FIG. 19A shows a first mesh simplification example without mesh repair, and FIG. 19B shows a second mesh simplification example using mesh repair by the mesh repair pipeline (101) before making quadratic error metric (QEM) simplification. The model repaired by the mesh repair pipeline (101) can better preserve the original shape after simplification.

FIGS. 20A and 20B show examples of Boolean operations in some examples. FIG. 20A shows a first Boolean operation example without mesh repair, and FIG. 20B shows a second Boolean operation example using mesh repair by the mesh repair pipeline (101). After applying the Boolean operation directly to the input meshes, the resulting mesh is broken due to wrong orientation M1's bottom and tiny gaps, which may not be visible in the image. However, the mesh repair pipeline (101) can successfully repair the mesh M1, enabling the Boolean operation to output the correct result.

Figure 21B:
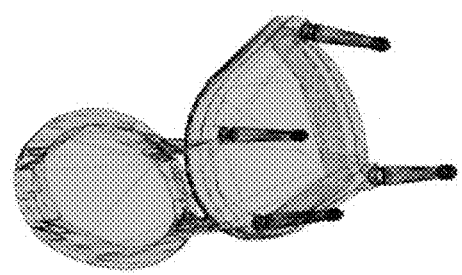
FIGS. 21A and 21B show examples of geodesic distance computation in some examples.
Figure 21A:
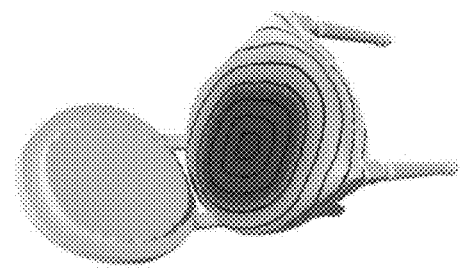

FIGS. 21A and 21B show examples of geodesic distance computation in some examples. FIG. 21A shows a first geodesic distance computation example without mesh repair, and FIG. 21B shows a second geodesic distance computation example using mesh repair by the mesh repair pipeline (101). Computing geodesic distances on the input mesh without mesh repair can result in incorrect results due to disconnectivity and inner structure as shown by FIG. 21A. However, computing geodesic distances on the repaired mesh by the mesh repair pipeline (101) can produced a more desired distance map as shown by FIG. 21B.

Figures 22A, 22B:
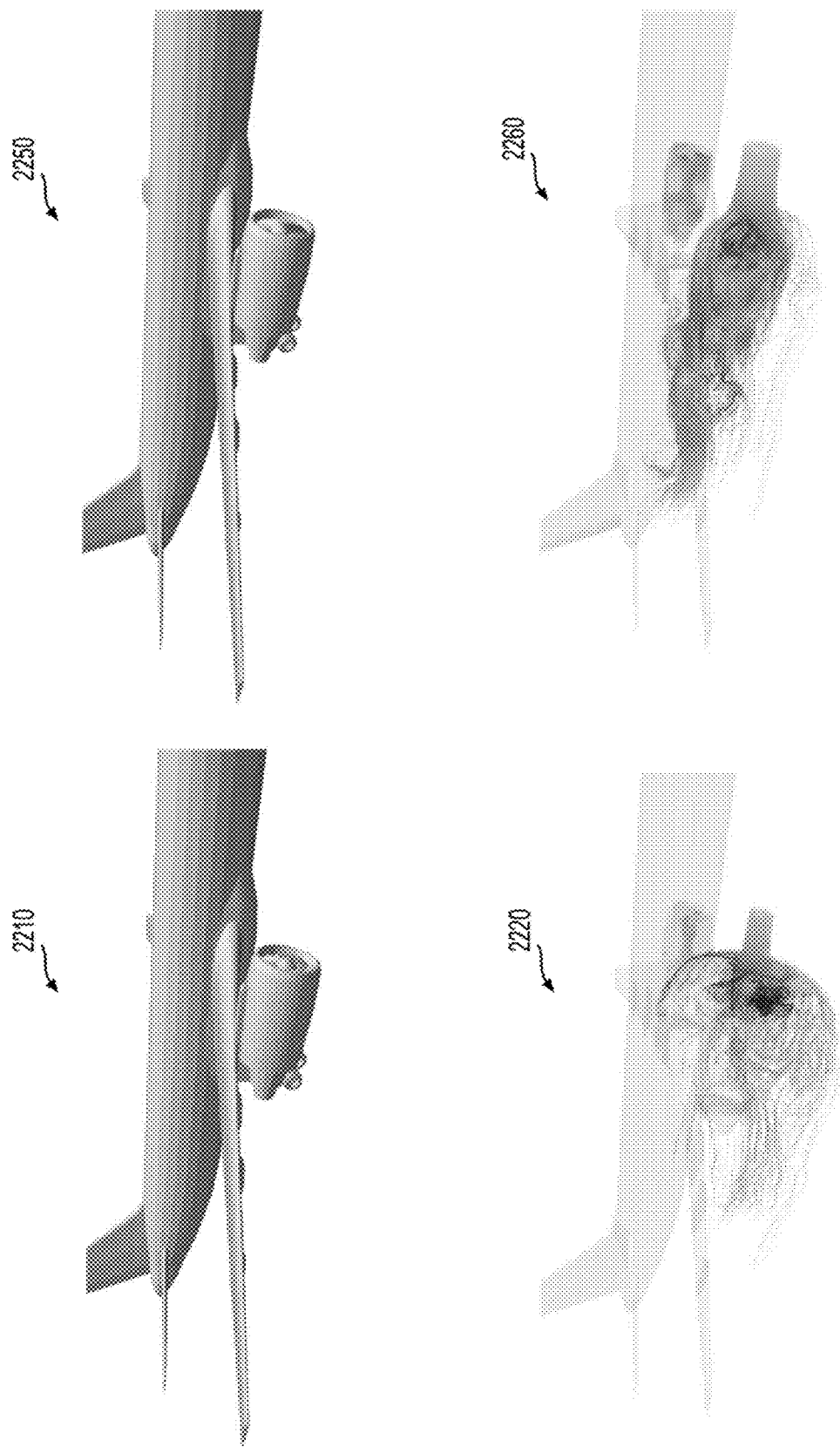
FIGS. 22A and 22B show examples of fluid simulation in some examples.

FIGS. 22A and 22B show examples of fluid simulation in some examples. FIG. 22A shows a first mesh (2210) and a first fluid simulation (2220) based on the first mesh (2210), and FIG. 22B shows a second mesh (2250) and a second fluid simulation (2260) based on the second mesh (2250). The first mesh (2210) is result from mesh repair by the related 7 in a closed engine model that does not allow airflow passage. In contrast, the second mesh (2250) is result from the mesh repair pipeline and preserves the original structure of the engine and allows for the correct flow of fluid through the model.

It is evident that meshes repaired by the mesh repair pipeline (101) facilitate these applications, while the input meshes cannot be used due to their geometric and topological errors. On the other hand, combining the visual repair and volume mesher results in the loss of original geometric structures, rendering the simulation results useless, such as shown by FIGS. 22A-B.

Some aspects of the disclosure provide three visual measures to assess visibility, orientation, and openness, and a novel framework for mesh repair that incorporates the visual measures into steps, such as local open surface closing, face reorientation, and global graph cut using a visual-guided objective function. A set of 500 models randomly selected from ShapeNet are shown to show effectiveness and robustness in comparison to some related techniques. The inclusion of visual measures can enhance the resilience and efficacy of mesh repair techniques. In some examples, evaluating structures with channel-like characteristics poses challenges in terms of efficiency, primarily due to a limited number of bounce and ray samples. For instance, even with a substantial opening at the base, the ears of the bunny model do not manifest a shell-like structure. In some examples, differentiable rendering techniques can be used to fill textures for newly added faces. In some examples, output mesh can be re-meshed to improve the mesh quality, e.g., mesh aspect ratio.

Figure 23:
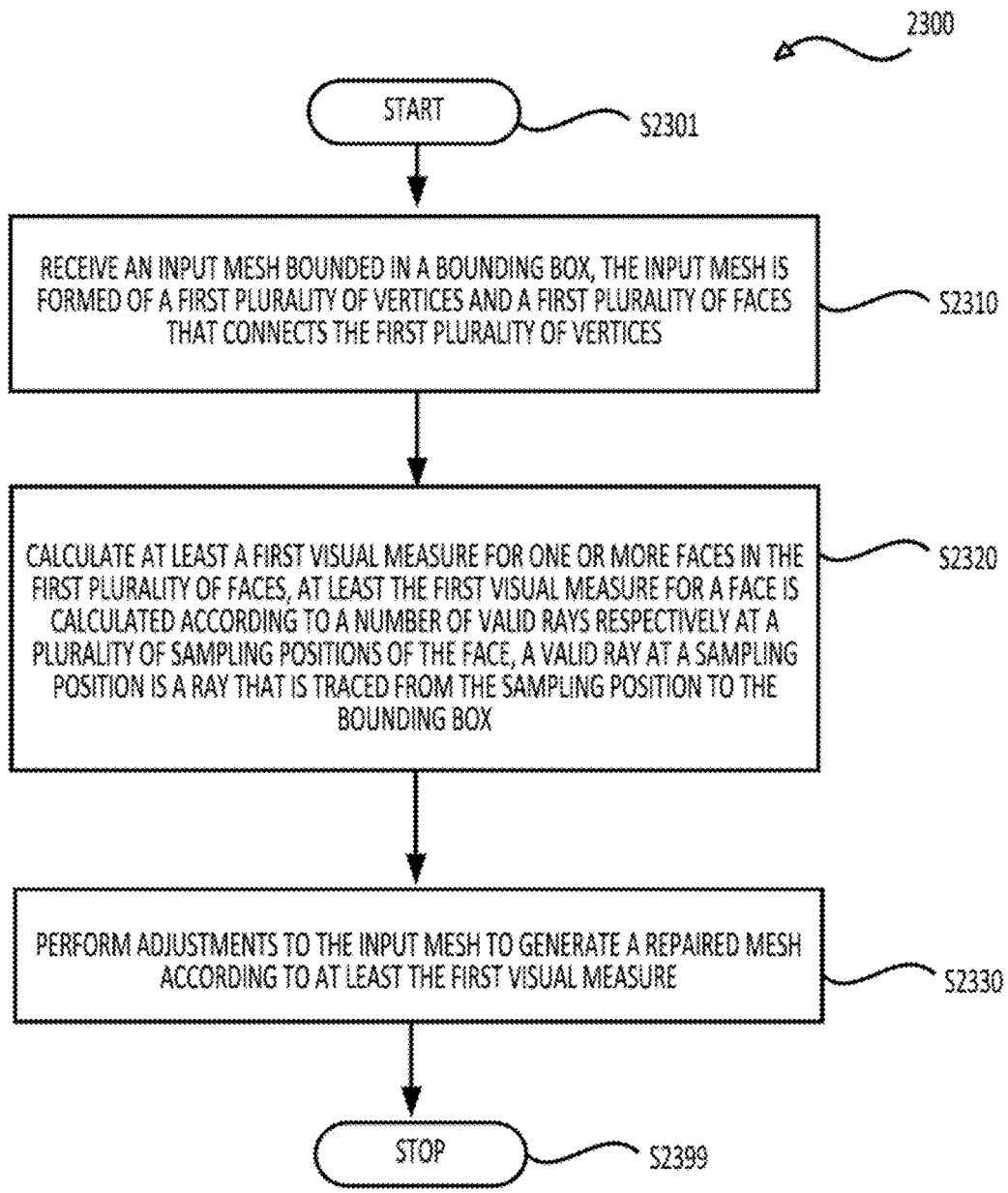
FIG. 23 shows a flow chart outlining a process according to some aspects of the disclosure.

FIG. 23 shows a flow chart outlining a process (2300) according to an embodiment of the disclosure. In some embodiments, the process (2300) is implemented as software instructions of algorithms, thus when processing circuitry executes the software instructions, the processing circuitry performs the process (2300). The process starts at (S2301) and proceeds to (S2310).

At (S2310), an input mesh is received. The input mesh can be bounded in a bounding box. The input mesh is formed of a first plurality of vertices and a first plurality of faces that connects the first plurality of vertices.

At (S2320), at least a first visual measure is calculated for one or more faces in the first plurality of faces. At least the first visual measure for a face is calculated according to a number of valid rays respectively at a plurality of sampling positions of the face. A valid ray at a sampling position is a ray that is traced from the sampling position to the bounding box.

At (S2330), adjustments to the input mesh are performed according to at least the first visual measure to generate a repaired mesh.

According to an aspect of the disclosure, to calculate at least the first visual measure, a first number of valid rays at a first sampling position at a positive side of the face is determined, the positive side is pointed by a face normal of the face. Further, a second number of valid rays at the first sampling position at a negative side of the face is determined, the negative side is opposite of the positive side. At least the first visual measure of the face is calculated according to at least the first number of valid rays and the second number of valid rays.

In some examples, at least the first visual measure includes a visibility measure. To calculate the visibility measure, among first numbers of valid rays respectively associated with the plurality of sampling positions at the positive side of the face and second numbers of valid rays respectively associated with the plurality of sampling positions at the negative side of the face, a maximum number of valid rays is determined. The visibility measure for the face is calculated based on the maximum number of valid rays, such as an example of the visibility measure $\Phi_{visibility}$ in Eq. (2).

In some examples, at least the first visual measure includes an orientation measure. To calculate the orientation measure, a difference of a first total number of valid rays at the positive side of the face and a second total number of valid rays at the negative side of the face is calculated. The orientation measure for the face is calculated based on the difference, such as an example of the orientation measure $\Phi_{orientation}$ in Eq. (3).

In some examples, at least the first visual measure includes an openness measure. To calculate the openness measure, a ratio between a smaller one of the first number of valid rays and the second number of valid rays and a larger one of the first number of valid rays and the second number of valid rays is calculated. The openness measure is calculated based on the ratio, such as an example of openness measure $\Phi_{openness}$ in Eq. (4).

In some examples, the orientation measure for the face is indicative of the face being misoriented, and the face normal of the face is flipped to an opposite direction for an orientation adjustment of the face. The orientation adjustment is a part of local repair in some examples.

In some examples, the openness measure for the face indicates that the face is an open surface, and a closed shell for an openness adjustment of the face is formed, the closed shell is formed by vertices of the face and additional vertices that offset the vertices of the face by a distance. The vertices of the face and the additional vertices are connected by faces that form the closed shell. In an example, the additional vertices are offset from the vertices of the face in an opposite direction of the face normal by the distance. The distance is a user-defined distance in an example. The openness adjustment is a part of local repair in some examples.

In some examples, an intermediate mesh is generated with initial adjustments (e.g., local repair) to the input mesh. The intermediate mesh is formed by a second plurality of vertices and a second plurality of faces that connects the second plurality of vertices. The second plurality of faces includes the first plurality of faces. In some examples, an initial space partition of a volume in the bounding box is performed based on the second plurality of vertices. Further, an additional space partition of the volume in the bounding box can be performed according to the second plurality of faces. Thus, the volume is partitioned into cells by a plurality of splitting faces, the plurality of splitting faces includes the second plurality of faces. The plurality of splitting faces can be classified into visible faces, invisible faces and extra faces based on the visibility measure for the plurality of splitting faces. An interface mesh is determined from the plurality of splitting faces. In some examples, the interface mesh is determined to maximize a use of the visible faces and to minimize a use of the extra faces.

In an example, classifications for the cells are determined to minimize a cost function, each of the cells is classified into one of an interior cell and an exterior cell, the cost function has a first portion and a second portion. The first portion penalizes incorrectly oriented faces in the visible faces in response to the classifications, and the second portion penalizes a use of one or more faces from the extra faces in the interface mesh that borders interior cells with exterior cells. An example of the cost function is shown in Eq. (9)-Eq. (12).

In some examples, the number of sampling portions of a face is determined based on an area of the face and a minimum sampling number for each face, such as shown in Eq. (1).

Then, the process proceeds to (S2399) and terminates.

The process (2300) can be suitably adapted. Step(s) in the process (2300) can be modified and/or omitted. Additional step(s) can be added. Any suitable order of implementation can be used.

The techniques described above, can be implemented as computer software using computer-readable instructions and physically stored in one or more computer-readable media. For example, FIG. 24 shows a computer system (2400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 24:
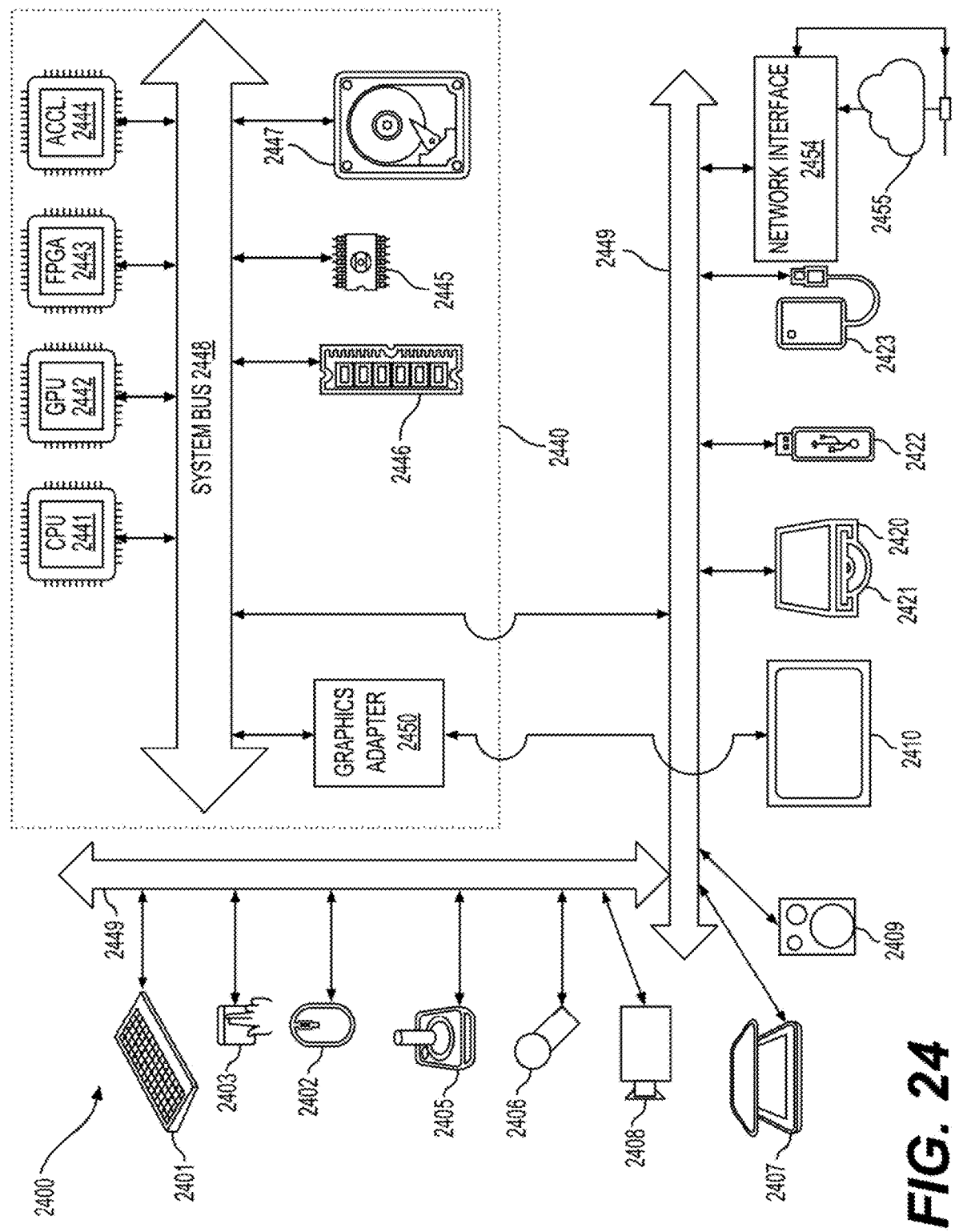
FIG. 24 is a schematic illustration of a computer system in accordance with an embodiment.

The components shown in FIG. 24 for computer system (2400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2400).

Computer system (2400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2401), mouse (2402), trackpad (2403), touch screen (2410), data-glove (not shown), joystick (2405), microphone (2406), scanner (2407), camera (2408).

Computer system (2400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2410), data-glove (not shown), or joystick (2405), but there can also be tactile feedback devices that do not serve as input devices), audio output devices (such as: speakers (2409), headphones (not depicted)), visual output devices (such as screens (2410) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (2400) can also include human accessible storage devices and their associated media such as optical media including CD/DVD ROM/RW (2420) with CD/DVD or the like media (2421), thumb-drive (2422), removable hard drive or solid state drive (2423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2400) can also include an interface (2454) to one or more communication networks (2455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2449) (such as, for example USB ports of the computer system (2400)); others are commonly integrated into the core of the computer system (2400) by attachment to a system bus as described below (for example Ethernet interface into a PC computer system or cellular network interface into a smartphone computer system). Using any of these networks, computer system (2400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2440) of the computer system (2400).

The core (2440) can include one or more Central Processing Units (CPU) (2441), Graphics Processing Units (GPU) (2442), specialized programmable processing units in the form of Field Programmable Gate Areas (FPGA) (2443), hardware accelerators for certain tasks (2444), graphics adapters (2450), and so forth. These devices, along with Read-only memory (ROM) (2445), Random-access memory (2446), internal mass storage such as internal non-user accessible hard drives, SSDs, and the like (2447), may be connected through a system bus (2448). In some computer systems, the system bus (2448) can be accessible in the form of one or more physical plugs to enable extensions by additional CPUs, GPU, and the like. The peripheral devices can be attached either directly to the core's system bus (2448), or through a peripheral bus (2449). In an example, the screen (2410) can be connected to the graphics adapter (2450). Architectures for a peripheral bus include PCI, USB, and the like.

CPUs (2441), GPUs (2442), FPGAs (2443), and accelerators (2444) can execute certain instructions that, in combination, can make up the aforementioned computer code. That computer code can be stored in ROM (2445) or RAM (2446). Transitional data can be also be stored in RAM (2446), whereas permanent data can be stored for example, in the internal mass storage (2447). Fast storage and retrieve to any of the memory devices can be enabled through the use of cache memory, that can be closely associated with one or more CPU (2441), GPU (2442), mass storage (2447), ROM (2445), RAM (2446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2400), and specifically the core (2440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2440) that are of non-transitory nature, such as core-internal mass storage (2447) or ROM (2445). The software implementing various embodiments of the present disclosure can be stored in such devices and executed by core (2440). A computer-readable medium can include one or more memory devices or chips, according to particular needs. The software can cause the core (2440) and specifically the processors therein (including CPU, GPU, FPGA, and the like) to execute particular processes or particular parts of particular processes described herein, including defining data structures stored in RAM (2446) and modifying such data structures according to the processes defined by the software. In addition or as an alternative, the computer system can provide functionality as a result of logic hardwired or otherwise embodied in a circuit (for example: accelerator (2444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of mesh processing, comprising:
   receiving an input mesh that is bounded in a bounding box, the input mesh being formed of a first plurality of vertices and a first plurality of faces that connects the first plurality of vertices;
   calculating at least one first visual measure for one or more faces in the first plurality of faces, one of the at least one first visual measure for a face in the one or more faces being calculated according to a number of valid rays respectively at a plurality of sampling positions of the face, a valid ray at a sampling position being a ray that is traced from the sampling position of the face to the bounding box; and
   performing adjustments to the input mesh to generate a repaired mesh according to the at least one first visual measure, wherein
   the calculating includes:
      determining a first number of valid rays at a first sampling position at a positive side of the face, the positive side being indicated by a face normal of the face, the first sampling position being one of the plurality of sampling positions, the first number of valid rays being from the first sampling position;
      determining a second number of valid rays at the first sampling position at a negative side of the face, the negative side being opposite to the positive side, the second number of valid rays being from the first sampling position; and
      calculating the at least one first visual measure of the face according to the first number of valid rays and the second number of valid rays.

2. The method of claim 1, wherein the at least one first visual measure comprises a visibility measure, and the calculating comprises:
   determining, among first numbers of valid rays respectively associated with the plurality of sampling positions at the positive side of the face and second numbers of valid rays respectively associated with the plurality of sampling positions at the negative side of the face, a maximum number of valid rays; and
   calculating the visibility measure for the face based on the maximum number of valid rays.

3. The method of claim 2, wherein the performing the adjustments to the input mesh further comprises:
   generating an intermediate mesh with initial adjustments to the input mesh, the intermediate mesh being formed by a second plurality of vertices and a second plurality of faces that connects the second plurality of vertices, the second plurality of faces including the first plurality of faces;
   performing an initial space partition of a volume in the bounding box based on the second plurality of vertices;
   performing an additional space partition of the volume in the bounding box according to the second plurality of faces, the volume being partitioned into cells by a plurality of splitting faces, the plurality of splitting faces including the second plurality of faces;
   classifying the plurality of splitting faces into visible faces, invisible faces, and extra faces based on the visibility measure for the plurality of splitting faces; and
   determining an interface mesh from the plurality of splitting faces, the interface mesh maximizing a use of the visible faces and minimizing a use of the extra faces.

4. The method of claim 3, wherein the determining the interface mesh further comprises:
   determining classifications for the cells that minimize a cost function, each of the cells being classified into one of an interior cell and an exterior cell, the cost function having a first portion that penalizes incorrectly oriented faces in the visible faces based on the classifications, and a second portion that penalizes a use of one or more faces from the extra faces in the interface mesh that borders interior cells with exterior cells.

5. The method of claim 1, wherein the at least one first visual measure comprises an orientation measure, and the calculating comprises:
   calculating a difference of a first total number of valid rays at the positive side of the face and a second total number of valid rays at the negative side of the face; and
   calculating the orientation measure for the face based on the difference.

6. The method of claim 5, wherein the performing the adjustments to the input mesh further comprises:
   determining that the orientation measure for the face is indicative of the face being misoriented; and
   when the face is misoriented, flipping the face normal of the face to an opposite direction for an orientation adjustment of the face.

7. The method of claim 1, wherein the at least one first visual measure comprises an openness measure, and the calculating comprises:
   calculating a ratio between a smaller one of the first number of valid rays and the second number of valid rays and a larger one of the first number of valid rays and the second number of valid rays; and
   calculating a value of the openness measure based on the ratio.

8. The method of claim 7, wherein the performing the adjustments to the input mesh further comprises:
   determining that the openness measure for the face indicates the face is an open surface; and
   the face is the open surface, forming a closed shell for an openness adjustment of the face, the closed shell being formed by vertices of the face and additional vertices that offset the vertices of the face by a distance.

9. The method of claim 8, wherein the additional vertices are offset from the vertices of the face in an opposite direction of the face normal by the distance.

10. The method of claim 1, wherein the calculating the at least one first visual measure further comprises:
    determining the plurality of sampling positions of the face based on an area of the face and a minimum sampling number for each face.

11. The method of claim 1, wherein
    the valid rays at the positive side of the face uniformly sample directions in a first hemisphere, and lie in different planes; and
    the valid rays at the negative side of the face uniformly sample directions in a second hemisphere, and lie in different planes.

12. An apparatus, comprising processing circuitry configured to:
    receive an input mesh that is bounded in a bounding box, the input mesh being formed of a first plurality of vertices and a first plurality of faces that connects the first plurality of vertices;
    calculate at least one first visual measure for one or more faces in the first plurality of faces, one of the at least one first visual measure for a face in the one or more faces being calculated according to a number of valid rays respectively at a plurality of sampling positions of the face, a valid ray at a sampling position being a ray that is traced from the sampling position of the face to the bounding box; and perform adjustments to the input mesh to generate a repaired mesh according to the at least one first visual measure, wherein to calculate the at least one first visual measure, the processing circuitry is configured to:

determine a first number of valid rays at a first sampling position at a positive side of the face, the positive side being indicated by a face normal of the face, the first sampling position being one of the plurality of sampling positions, the first number of valid rays being from the first sampling position;

determine a second number of valid rays at the first sampling position at a negative side of the face, the negative side being opposite to the positive side, the second number of valid rays being from the first sampling position; and calculate the at least one first visual measure of the face according to the first number of valid rays and the second number of valid rays.

13. The apparatus of claim 12, wherein the at least one first visual measure comprises a visibility measure, and the processing circuitry is configured to:

determine, among first numbers of valid rays respectively associated with the plurality of sampling positions at the positive side of the face and second numbers of valid rays respectively associated with the plurality of sampling positions at the negative side of the face, a maximum number of valid rays; and calculate the visibility measure for the face based on the maximum number of valid rays.

14. The apparatus of claim 13, wherein the processing circuitry is configured to:

generate an intermediate mesh with initial adjustments to the input mesh, the intermediate mesh being formed by a second plurality of vertices and a second plurality of faces that connects the second plurality of vertices, the second plurality of faces including the first plurality of faces;

perform an initial space partition of a volume in the bounding box based on the second plurality of vertices;

perform an additional space partition of the volume in the bounding box according to the second plurality of faces, the volume being partitioned into cells by a plurality of splitting faces, the plurality of splitting faces including the second plurality of faces;

classify the plurality of splitting faces into visible faces, invisible faces, and extra faces based on the visibility measure for the plurality of splitting faces; and determine an interface mesh from the plurality of splitting faces, the interface mesh maximizing a use of the visible faces and minimizing a use of the extra faces.

15. The apparatus of claim 12, wherein the at least one first visual measure comprises an orientation measure, and the processing circuitry is configured to:

calculate a difference of a first total number of valid rays at the positive side of the face and a second total number of valid rays at the negative side of the face; and calculate the orientation measure for the face based on the difference.

16. The apparatus of claim 15, wherein the processing circuitry is configured to:

determine that the orientation measure for the face is indicative of the face being misoriented; and when the face is misoriented, flip the face normal of the face to an opposite direction for an orientation adjustment of the face.

17. The apparatus of claim 12, wherein the at least one first visual measure comprises an openness measure, and the processing circuitry is configured to:

calculate a ratio between a smaller one of the first number of valid rays and the second number of valid rays and a larger one of the first number of valid rays and the second number of valid rays; and calculate a value of the openness measure based on the ratio.

18. The apparatus of claim 17, wherein the processing circuitry is configured to:

determine that the openness measure for the face indicates the face being an open surface; and when the face is the open surface, form a closed shell for an openness adjustment of the face, the closed shell being formed by vertices of the face and additional vertices that offset the vertices of the face by a distance.

* * * * *